(12) United States Patent
Wheelock

(10) Patent No.: US 9,641,578 B2
(45) Date of Patent: May 2, 2017

(54) MINIMIZING UNICAST BANDWIDTH IN AN ADAPTIVE BIT RATE SYSTEM

(71) Applicant: ARRIS Enterprises, Inc., Suwanee, GA (US)

(72) Inventor: Ian Wheelock, Blackrock (IE)

(73) Assignee: ARRIS Enterprises, Inc., Suwanee, GA (US)

(*) Notice: Subject to any disclaimer, the term of this patent is extended or adjusted under 35 U.S.C. 154(b) by 65 days.

(21) Appl. No.: 14/677,064

(22) Filed: Apr. 2, 2015

(65) Prior Publication Data

US 2016/0294898 A1 Oct. 6, 2016

(51) Int. Cl.
| | |
|---|---|
| *H04L 29/06* | (2006.01) |
| *H04N 21/2343* | (2011.01) |
| *H04N 21/6405* | (2011.01) |
| *H04N 21/643* | (2011.01) |
| *H04N 21/845* | (2011.01) |
| *H04N 21/8543* | (2011.01) |
| *H04L 29/08* | (2006.01) |
| *H04L 12/811* | (2013.01) |
| *H04L 12/823* | (2013.01) |
| *H04L 12/801* | (2013.01) |

(52) U.S. Cl.
CPC ...... *H04L 65/4076* (2013.01); *H04L 65/4084* (2013.01); *H04L 65/4092* (2013.01); *H04L 65/602* (2013.01); *H04L 65/608* (2013.01); *H04L 65/80* (2013.01); *H04L 67/02* (2013.01); *H04N 21/23439* (2013.01); *H04N 21/6405* (2013.01); *H04N 21/64322* (2013.01); *H04N 21/8456* (2013.01); *H04N 21/8543* (2013.01); *H04L 47/32* (2013.01); *H04L 47/34* (2013.01); *H04L 47/38* (2013.01)

(58) Field of Classification Search
None
See application file for complete search history.

(56) References Cited

U.S. PATENT DOCUMENTS

| | | | | |
|---|---|---|---|---|
| 8,532,171 | B1 * | 9/2013 | Narayanan | H04N 21/8451 375/240.01 |
| 9,407,968 | B2 * | 8/2016 | Hao | H04N 21/6405 |
| 2014/0355603 | A1 * | 12/2014 | Li | H04L 12/184 370/390 |

* cited by examiner

*Primary Examiner* — Anh Ngoc Nguyen
(74) *Attorney, Agent, or Firm* — Lori Anne D. Swanson

(57) ABSTRACT

A multicast adaptive bit rate receiver is employed delay issuance of specific unicast HTTP adaptive bit rate media segment requests while waiting for receipt of stripped multicast media segments from a multicast server. An HTTP proxy may create a new internal state that waits for subsequent media segment URL requests. As the stripped multicast media segments are received, the HTTP requests queued in the proxy may be delivered to the local ABR client.

20 Claims, 11 Drawing Sheets

MINIMIZING UNICAST BANDWIDTH IN AN ADAPTIVE BIT RATE SYSTEM

CROSS-REFERENCE TO RELATED APPLICATIONS

This application claims the benefit of priority under 35 U.S.C. §119(e) to U.S. Provisional Application No. 61/988,504 entitled "MINIMIZING UNICAST BANDWIDTH DURING CHANNEL CHANGE," filed on May 5, 2014, the entire disclosure of which is incorporated herein by reference.

BACKGROUND

An internet protocol video delivery network based on adaptive streaming techniques can provide many advantages over traditional cable delivery systems, such as greater flexibility, reliability, lower integration costs, new services, and new features. Adaptive streaming, also known as adaptive bitrate (ABR) streaming, is a delivery method for streaming video over Internet Protocol (IP). Adaptive bitrate streaming is a technique for streaming multimedia across computer networks where the source content is encoded at multiple bit rates. Adaptive bitrate (ABR) streaming uses encoders or packagers to provide multiple different bitrates for the same multimedia content (resulting in different quality levels). ABR clients monitor the network and player resources to determine which bitrate to request when streaming content. The ABR client can switch to different bitrates depending on the state of these resources.

In multicast ABR (MABR) solutions (where a particular encoded bitrate is delivered as multicast to remote ABR clients), the system may have to revert to the use of unicast requests in order to retrieve some media segments. For example, during channel change times or ad-breaks, the demand for unicast traffic is likely to peak and may result in excessive congestion throughout the network.

Thus, improved techniques for minimizing unicast bandwidth, particularly during high congestion periods of unicast requests, are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

DETAILED DESCRIPTION

Disclosed herein are techniques for a stripped multicast playout of prior segments of a multicast session, such that the stripped multicast segments are made available during the multicast session for a current multicast adaptive bit rate (MABR) media segment. Adaptive bitrate (ABR) streaming is based on Hypertext Transfer Protocol (HTTP) compared to previous IP video streaming protocols that relied upon Real-Time Transport Protocol (RTP) with Real-Time Streaming Protocol RTSP. ABR systems may be designed to capitalize on intermediate HTTP caching servers to help with the distribution of multimedia content from an Origin Server (OS) to requesting clients.

In embodiments, an MABR receiver HTTP proxy delays or defers issuance of specific unicast HTTP ABR media segment requests while waiting for receipt of stripped multicast media segments. For example, in response to the receipt of configuration information that identifies that a stripped multicast stream of the recent fragments is available, the MABR receiver holds off responding to unicast requests from one or more adaptive bitrate clients. In embodiments, the HTTP proxy receives identifiers, e.g., signals from an internal packet filtering, that a client has issued a unicast request for either a MASTER manifest or a variant playlist uniform resource identifier (URL)s, resulting in the HTTP proxy creating a new internal state that waits for subsequent media segment URL requests. If the stripped multicast stream of the recent fragments are not available or has not been identified, the unicast request may issue without delay, e.g., without waiting for a receipt of stripped multicast media segments. As the stripped multicast media segments are received, the HTTP requests queued in the proxy may be delivered to the local ABR client.

Figure 1A:
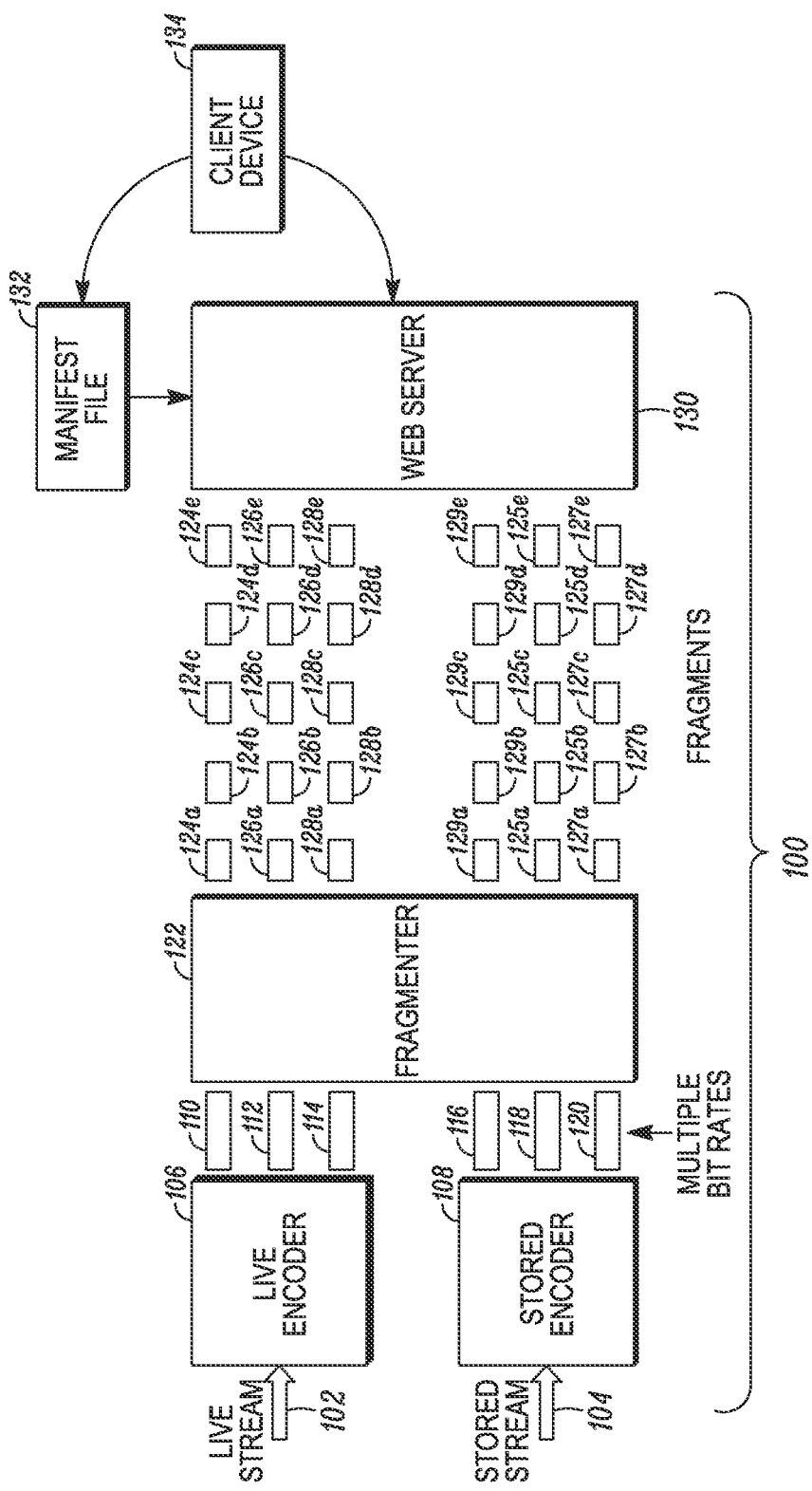
FIG. 1A depicts a high level illustration of a representative adaptive bit rate system that delivers content to adaptive bit rate client device.

FIG. 1A depicts a high level illustration of a representative adaptive bit rate system 100 that delivers content to adaptive bit rate client device 134 via an internet protocol content delivery network. An adaptive bit rate client device is a client device capable of providing streaming playback by requesting an appropriate series of segments from an adaptive bit rate system 100 over an internet protocol content delivery network (CDN). ABR streaming relies on encoders or packagers to provide multiple different bitrates for the same multimedia content (resulting in different quality levels of the same content). ABR clients monitor the network and player resources to determine which bitrate to request when streaming content. The ABR client can switch to different bitrates depending on the state of these resources.

The adaptive bit rate client device associated with a user or a subscriber may include a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), the upcoming High Efficiency Video Coding (HEVC) standard, and extensions of such standards, to transmit and receive digital video information more efficiently.

As shown in FIG. 1A, the content provided to the adaptive bit rate system 100 may be in the form of a live stream 102, such as from a live content backbone, or a stored stream 104, such as a network digital video recorder (nDVR) content storage or a VOD content storage. The live content backbone may be any number of possible cable or content provider networks and manners for distributing content (e.g., satellite, fiber, the Internet, etc.). The example live content backbone 102 is a non-limiting example of a content source for adaptive bit rate streaming, which may include any number of multiple service operators (MSOs), such as cable and broadband service providers who provide both cable and Internet services to subscribers, and operate content delivery networks in which Internet Protocol (IP) is used for delivery of television programs (i.e., IPTV) over a digital packet-switched network.

An adaptive bit rate system, such as the adaptive bit rate system 100 shown in FIG. 1A, uses adaptive streaming to deliver content to its subscribers. Adaptive streaming, also known as ABR streaming, is based on a series of short progressive downloads applicable to the delivery of both live and on demand content. Adaptive bitrate streaming works by breaking the overall media stream into a sequence of small file downloads, each download loading one short segment, or chunk, of an overall potentially unbounded transport stream.

As shown in FIG. 1A, a packager 100 includes an encoder 106 or 108, a fragmenter 122, and a web server 130 (e.g., HTTP streaming server). The packager 100 outputs a manifest file 132 for adaptive bit rate metadata. The adaptive bit rate system delivers the manifest file and corresponding content using adaptive bit rate techniques to an adaptive bit rate client device 134.

With ABR streaming, source content is encoded at different bitrates and then split into small media segments. Generally, an adaptive bit rate packager 100 is responsible for communicating with each client/subscriber and preparing ("packaging") individual adaptive bit rate streams. The packager 100 is designed to fragment, or "chunk," media files and to encapsulate those files in a container expected by the particular type of adaptive bit rate client. Thus, a whole video may be segmented in to what is commonly referred to as chunks or adaptive bit rate fragments. The adaptive bit rate fragments are available at different bit rates, each of a finite duration. The adaptive bit rate system generates or identifies the media segments of the requested media content as streaming media content. Along with the delivery of media, the packager creates and delivers manifest files.

ABR streaming may be based on a series of short Hypertext Transfer Protocol (HTTP) progressive downloads applicable to the delivery of both live and on demand content. ABR systems can use HTTP as the transport protocol and the ABR client can perform a media download as a series of very small files. The content is cut into many small segments (chunks) and encoded into the desired formats. As used herein, a chunk is a small file containing a short video segment along with associated audio and other data. In some cases these chunks may be standalone files, or may be sections (i.e., byte ranges) of one much larger file. For simplicity the term 'chunk' is used to refer to both of these cases (many small files or fewer large files).

Adaptive streaming may use the Hypertext Transfer Protocol (HTTP) as the transport protocol for these video chunks. For example, 'chunks' or 'chunk files' may be short sections of media (e.g., 2 to 10 second sections of media) retrieved in an HTTP request by an adaptive bit rate client. The ABR client may use HTTP transfer to download each media segment URL.

FIG. 1A depicts the processing for both a live stream 102 and/or a stored stream 104 may be input to a real-time encoder or a non-real time encoder, 106, 108, respectively. The encoder converts whole content streams in to multiple streams at different bit rates. For example, an encoder is responsible for taking an MPEG stream (e.g., MPEG-2/MPEG-4) or a stored MPEG stream (e.g., MPEG-2/MPEG-4), encoding it digitally, encapsulating it in to MPEG-4 single program transport streams (SPTS) multiple bit rates formats, and preparing the encapsulated media for distribution. An encoder typically encodes units of multimedia content (known as a Group of Pictures (GOP)) into media segments.

In the example shown in FIG. 1A, the live stream 102 may be encoded into three transport streams, 110, 112, 114, each having a different bit rate. The live stream 102 may be a broadcast of multimedia content from a content provider. The stored stream 104 is transcoded in to three transport streams, 116, 118, and 120, each having a different bit rate. The stored stream may be on demand content, for example.

Each media segment relates to a set duration of content (normally 2-4 seconds), and gets encoded into multiple different bitrates. As shown in FIG. 1A, the resultant transport streams 110, 112, 114, 116, 118, and 120 are passed through a fragmenter 122. The fragmenter 122 reads each encoded stream 110, 112, 114, 116, 118, and 120 and divides them in to a series of fragments of a finite duration. For example, MPEG streams may be divided into a series of 2-3 second MPEG-4 fragments with multiple wrappers for the various adaptive streaming formats (e.g., Microsoft Smooth Streaming, APPLE HLS). As shown in FIG. 1A, the transport streams 110, 112, 114, are fragmented by fragmenter 122 into adaptive bit rate media segments 124a-e, 126a-e, and 128a-e, respectively. The transport streams 116, 118, and 120, are fragmented by fragmenter 122 into adaptive bit rate media segments 130a-e, 132a-e, and 134a-e, respectively. The fragmenter 122 is also referred to herein as a packager, as the packager can include fragmenting the content into fragments and then encrypting each fragment using a content key. In embodiments, media segments pass through a packager that also prepares a media playlist or manifest metadata associated with the content, and may also get each media segment encrypted using DRM.

The subscriber may submit a request for content via an internet protocol content delivery network (CDN) that can deliver adaptive bit rate file segments from a service provider or headend to end-user adaptive bit rate client devices.

Referring to FIG. 1A, a content delivery network (CDN) can be communicatively coupled between an origin or web server 130 and the client device 134, and may include one or more distribution nodes and/or content delivery servers (e.g., edge servers, or edge cache/streaming servers). The subscriber, via a respective client device 134, is responsible for retrieving the media file 'chunks,' or portions of media files, from the origin server 130 as needed to support the subscriber's desired playback operations.

ABR streaming involves the use of a master manifest 132 to identify the available bitrates for multimedia content. The manifest 132 may also include metadata for the content itself or metadata associated with a particular ABR client (e.g., if a specific manifest is issued per client). The packager 122 may create the manifest files 132 as the packager 122 performs the chunking operation for each type of adaptive bit rate streaming method. In adaptive bitrate protocols, the manifest files generated may include a variant playlist and a playlist file. The variant playlist describes the various formats (resolution, bit rate, codec, etc.) that are available for a given asset or content stream. The variant playlists may be ordered based on increasing resolution in the master playlist/manifest. A client may begin with the $1^{st}$ variant playlist, or the lowest resolution, when beginning playout of a new ABR stream, Depending on network and resource conditions, the client 134 may increment through the ordered variant playlists to in the order of the increasing resolution, working up to the highest bandwidth variant playlist. For each format, a corresponding playlist file may be provided. The playlist file identifies the media file chunks/segments that are available to the client. It is noted that the terms manifest files and playlist files may be referred to interchangeably herein. The client determines which format the client desires, as listed in the variant playlist, finds the corresponding manifest/playlist file name and location, and then retrieves media segments referenced in the manifest/playlist file.

Additional manifests may also be used, one for each available bitrate containing the list of available media segments. The available media segments are listed in time order with the earliest media segments present in the manifest corresponding to the start of content, and the media segments at the end corresponding to the end of content. Each media segment within the manifest files includes a unique URL that corresponds to the actual storage location of the multimedia content for the specific interval the media segment covers.

The packager 122 creates the manifest files 132 to be compliant with an adaptive bit rate streaming format of the associated media and also compliant with encryption of media content under various digital rights management (DRM) schemes. Depending on the type of content being streamed, the manifest files may be prepared differently. For example, for content with a known duration, the set of manifest files (with different bitrates) may include the complete set of required media segments to play the entire content. An ABR client 134 playing this content may retrieve the master manifest initially, then requests the different bitrate manifests depending on the network and compute resources available. As described above, the variant playlists may be ordered in the manifest file in increasing resolution/quality. The client may simply move up and down through the master playlist when selecting appropriate resolution video quality segments. Thus, the construction of manifest files varies based on the actual adaptive bit rate protocol.

The media segments listed in the different bitrate manifest files may all be aligned using a common media segment sequence number. For example, media segment sequence numbers typically increment. Thus, if an ABR client needs to switch bandwidth, it can simply download the required media segment sequence number identified in a different bitrate manifest file. The switchover between consecutive segments, regardless of the bitrate they are encoded with, is seamless, although the multimedia quality (predominantly video) is likely to change. Depending on the number of available encoded bitrates, the quality change may vary. Audio may be encoded with multimedia media segments, or may by encoded and available as a separate flow of audio media segments. The sequence numbers of media segments carrying multimedia content and any audio content are synchronized.

Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

In HLS, for example, the adaptive bit rate system 100 receives a media request from a subscriber 134 and generates or fetches a manifest file to send to the subscriber's playback device in response to the request. A manifest file can include links to media files as relative or absolute paths to a location on a local file system or as a network address, such as a URI path. In HLS, an m3u8 format is used as a non-limiting example to illustrate the principles of manifest files including non-standard variants.

The packager 100 can generate a manifest file that represents a playlist. The playlist can be a manifest file that lists the locations of the fragments of the multimedia content. By way of a non-limiting example, the manifest file can comprise a uniform resource locator (URL) for each fragment of the multimedia content. If encrypted, the manifest file can also comprise the content key used to encrypt the fragments of the multimedia content.

At the start of a streaming session, the adaptive bit rate client device 134 may receive the manifest file 132 containing metadata for the various sub-streams which are available. The initial request may be for the master manifest file that includes the variant playlist(s). Subsequent requests may be specific to a variant playlist that includes the media segment URLs. Upon receiving the master manifest file, the subscriber's client device 134 parses the manifest file and determines the chunks to request based on the variant playlist(s) in the manifest file. The adaptive bit rate client device 134 can fetch a first media segment posted to an origin server 130 for playback from a selected variant playlist in the master manifest file. For example, the user may use HTTP Get or Byterange requests to request media segments. Then, during playback of that media segment, the playback device may fetch a next media segment for playback after the first media segment, and so on until the end of the media content. This process continues for as long as the asset is being played (until the asset completes or the user tunes away). As the manifests are complete, once the client retrieves each bitrate manifest for a particular content, it is not required to retrieve them again for the duration of the playback of the content identified in the manifest.

Playback at the adaptive bit rate client device of the content in an adaptive bit rate environment, therefore, is enabled by the playlist or manifest file that directs the adaptive bit rate client device to the media segment locations, such as a series of uniform resource identifiers (URIs). For example, each URI in a manifest file is usable by the client to request a single HTTP chunk. The manifest file may reference live content or on demand content. Other metadata also may accompany the manifest file.

For live content, which has no set duration, the manifest files may be prepared differently than for stored content. For example, for live content the manifest file may be continually updated as live media is being made available. The encoder/packager provides a subset of media segments, based on the most recently encoded set of available media segments in the manifest. Each manifest may include anywhere from 10 media segments up to 60 media segments (or more). The encoder/packager refreshes the manifest files for every new media segment produced, which based on the media segment duration, e.g., every 2 to 4 seconds. Similar to the ABR client in the previous example, the ABR client retrieves the master manifest and picks a bitrate manifest suitable for the network and compute resources available. However, as the bitrate manifest is constantly being updated by the encoder/packager, the ABR client is generally required to periodically retrieve the most appropriate bitrate manifest in order to gain knowledge of the next available media segments. Note that some ABR streaming protocols include metadata to algorithmically determine the next available media segment URL, saving the ABR client from this constant retrieval overhead. However, sometimes the manifest file contains per player DRM keying information that applies to the next media segment, resulting in the player having to request the manifest file repeatedly, e.g., one for every new segment.

As described above, after fragmentation, the fragments and manifest files (list of assets fragment) are placed on a content delivery network server, such as published to origin server 130. The content delivery network logic may store the fragments according to an internal heuristic logic algorithm, determining whether and where to store the content. For example, more popular content may be stored in local storage to decrease network bandwidth usage and increase access speed. Less popular content may be stored in a central repository to reduce costs for fast storage. For example, content that may be stored includes on demand and network DVR content. Live non-DVR content fragments may be distributed by the content delivery network but not stored.

It is noted that an ABR system may rely on URLs to uniquely identify every individual media segment, also sometimes referred to as RESTful URLs. These URLs may maintain state information within the actual URL string enabling intermediate HTTP proxy/caches to be deployed throughout the CDN network. The intermediate HTTP proxy/caches may automatically cache any ABR segment that passes through the proxy, making it available for all subsequent requests that are received by that proxy. Such HTTP caching may automatically result in the distributed storage of ABR segments within the CDN without having to employ any explicit heuristic logic algorithm.

The use of an adaptive bit rate system that chunks media files allows the client to switch between different quality (size) chunks of a given asset, as dictated by network performance. The client has the capability by using the manifest file, to request specific fragments at a specific bit rate. As the stream is played, the client device may select from the different alternate streams containing the same material encoded at a variety of data rates, allowing the streaming session to adapt to the available data rate. For example, if, in the middle of a session, network performance becomes more sluggish, the client is able to switch to the lower quality stream and retrieve a smaller chunk. Conversely, if network performance improves the client is also free to switch back to the higher quality chunks.

A benefit of ABR streaming is that clients can react to varying network condition, and choose streaming bitrates that fit within the available network bandwidth. During the start of an ABR streaming session, the clients may begin with the lowest encoded bitrate in order to "sense" the network conditions and download media segments from the corresponding bitrate manifest. For example, generally the client begins with the first variant playlist listed within a master manifest file, the first variant playlist often the lowest resolution version of the requested content. If the network conditions allow (and other client resources are available) the ABR client can attempt to switch to the next highest bitrate available for the next ABR media segment. For example, during the start of an ABR streaming session, the ABR client retrieves the master manifest for the ABR stream, and identifies the lowest bitrate media manifest. It retrieves the media manifest, and begins requesting media segments from the list of available segments. Depending on how aggressive the client is, it may skip a next higher available bitrate to an even higher resolution playlist. The client device is not bound by a strict order of variant playlists in the master manifest file. Similarly, the client device may drop to a much lower bitrate in the event network/resource conditions change drastically.

Since adaptive bit rate media segments are available on the adaptive bit rate system in one of several bit rates, the client may switch bit rates at the media segment boundaries. Using the manifest file to adaptively request media segments allows the client to gauge network congestion and apply other heuristics to determine the optimal bit rate at which to request the media presentation segments/fragments from one instance in time to another. As conditions change the client is able to request subsequent fragments at higher or lower bitrates. Thus, the client can adjust its request for the next segment. The result is a system that can dynamically adjust to varying network congestion levels. Often, the quality of the video stream streamed to a client device is adjusted in real time based on the bandwidth and computer processing unit (CPU) of the client device. For example, the client may measure the available bandwidth and request an adaptive bit rate media segment that best matches a measured available bit rate.

Per service the packager may be configured to perform segmentation/chunking for either all output adaptive bit rate formats or a subset of the output adaptive bit rate streaming formats. The packager may create the respective manifest files. The chunk durations may be different for each adaptive bit rate format, but they will all have to be an integer multiple of the GOP size or key frame intervals. However for a given adaptive bit rate format the chunk durations will be the same for all streams in an output stream group.

Various ABR streaming protocols identify segment download strategies, in advance of any playout strategies. For live streaming, where the media manifest gets updated constantly as newly encoded media segments are made available, the ABR client attempts to download the most recent media segments in order to fill its play-out buffer. Most clients when starting try to download the three or four most recent media segments and then play from the oldest segment, mostly in an effort to prevent playback stalls from occurring.

The client may maintain a temporary cache of a few fragments and requests further fragments at optimally determined rates thus maintaining continuity of playback even through changing network bandwidth conditions. For example, the origin server 130 may store several chunk sizes for each segment in time. The adaptive bit rate client device 134 can predict the available bandwidth and requests the best chunk size, e.g., using the appropriate URI. Since the client is controlling when the content is requested, this is seen as a client-pull mechanism, compared to a push mechanism where the server pushes the content. Using URIs to create the manifest file enables very simple client devices to retrieve chunks using web browser-type interfaces.

Multicasting ABR media segments over a transport network may conserve bandwidth. For example, multicasting video file fragments may conserve network bandwidth. With multicast, a single source sends data to multiple destinations at one time. For example, each TV channel may have its own multicast. A multicast is joined when requested from a subscriber. Multicast makes the routers replicate fragments only when necessary. If the multicast is not already joined in a service group, then the first join from any subscriber in that service group starts it, similar to how SDV works.

The Multicast ABR concept may be achieved through a "bump in the middle" approach. ABR media segments are retrieved from the ABR streaming network by software and are multicast to multiple receivers using a unique multicast group for each ABR stream. In embodiments, only a single media bitrate from the available media bitrates (e.g., most commonly the highest bitrate) is requested. In embodiments, multiple bitrates may be multicast.

Figure 1B:
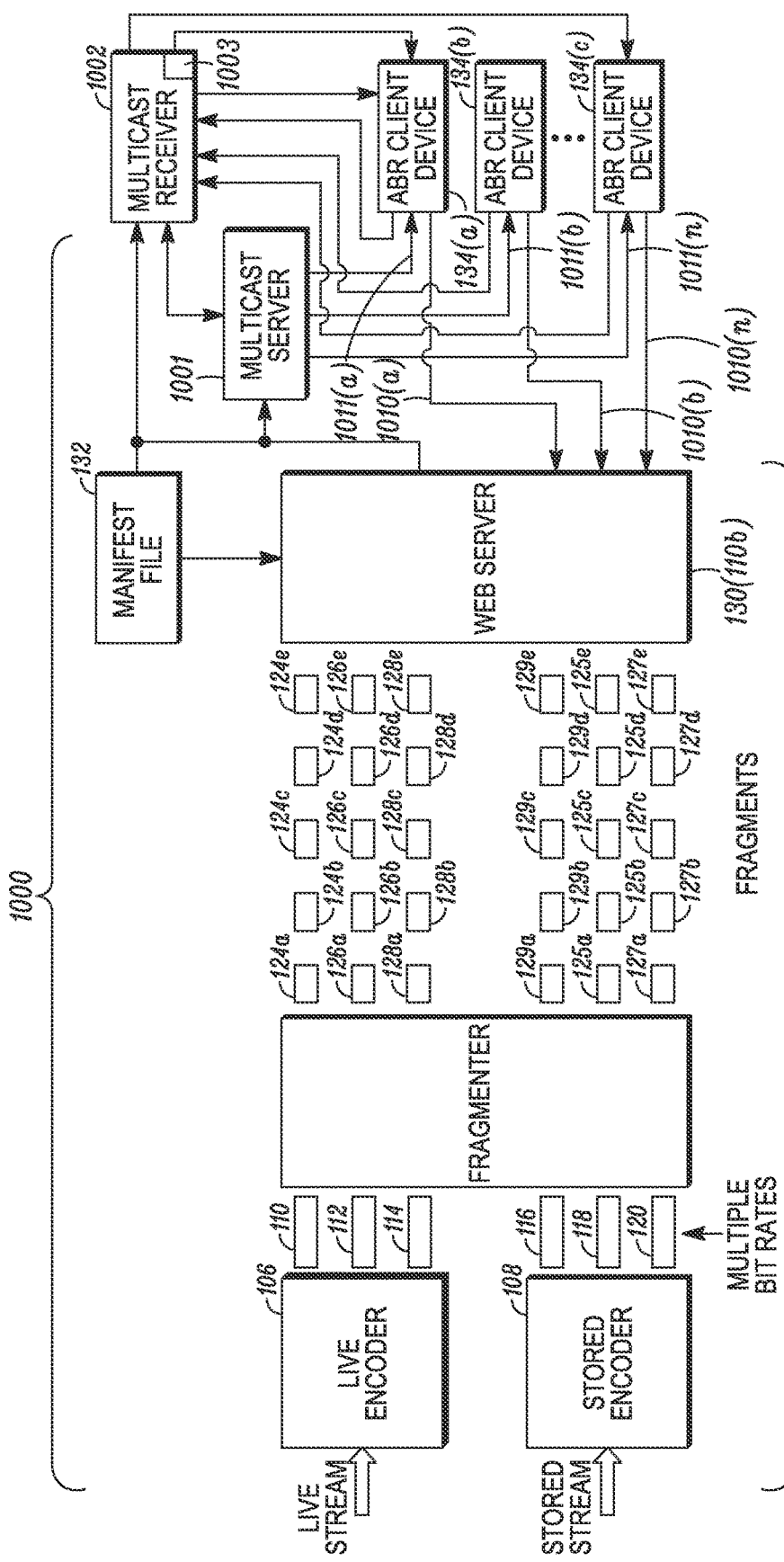
FIG. 1B depicts an example of an adaptive bitrate system configured with a multicast receiver for multicasting adaptive bitrate media segments to an adaptive bitrate client.

FIG. 1B depicts an example of the system shown in FIG. 1A configured with a multicast adaptive bitrate (MABR) receiver 1002 for multicasting ABR media segments over a transport network to the MABR receiver 1002 using a respective multicast group for each ABR stream or version of an ABR stream. As described in more detail below, the adaptive bit rate server 1000 may multicast an adaptive bitrate stream where source content is encoded at multiple bit rates segmented into segments. One or more servers in the ABR system 1000 may comprise the encoders and packagers of the ABR system, generate and deliver manifest files to clients via a multicast server 1001. A second server 1002, the multicast receiver, may receive the manifest file 132 generated by the first server and intercept requests from the adaptive bit rate clients 134.

The ABR client 134(*a*)-(*n*) may issue content requests, e.g., an HTTP request, for segments in the bitrate manifest file. The ABR client 134(*a*) may request a manifest file 132 associated with the first media asset from an adaptive bit rate server 1000 in a content delivery network 100. In response, the ABR client 134(*a*) receives a top-level manifest file 132 identifying a second level manifest file for each of one or more available streams of the first media asset, each second level manifest file associated with a bit rate and identifying media segments for a respective stream. The manifest file 132 from origin server 130 may also identify the most recent set of ABR segments. For live streaming, the media manifest gets updated as newly encoded media segments may be made available.

The master manifest file may identify to the ABR client 134 the available bitrates for multimedia content along with the metadata, and additional manifests for each available bitrate include the list of available media segments, wherein the list of available media segments are listed in time order with earliest media segment present corresponding to the start of content, and media segments at the end correspond to the need of the content, wherein each media segment within the manifest files 132 includes a unique URL that corresponds to the actual storage location of the multimedia content for the specific interval that the media segment covers.

Thus, the ABR client 134 may receive the manifest file 132 with information of available streams at differing bit rates and the segments of those streams, and the ABR client 134 may request segments from a first bitrate stream with option to switch streams to another one of the multiple bit rate streams.

The disclosed adaptive bit rate system shown in FIG. 1B may receive a request for content by a client device and may deliver fragments/segments of an adaptive bit rate stream segmented by the adaptive bit rate server 1000 via a multicast upstream for access by a plurality of clients 134. The fragments may be encoded at a plurality of bitrates.

The ABR client 134 may request to join a multicast session of the adaptive bit rate server 1000 multicasting from multicast server 1001. Thus, rather than the ABR client devices 134 sending/receiving segments strictly via unicast requests 1010(*a*)-(*n*), the multicast server 1001 may multicast content in multicasting sessions 1011(*a*)-(*n*) to which the ABR clients may join.

The ABR client 134 may require a plurality of media segments to be received before playout occurs and before joining an ABR multicast. For example, in an example startup case for ABR client 134(*a*), 3-4 media segments must be retrieved as fast as possible before being able to utilize MABR streaming option. A plurality of media segments may need to be retrieved by or delivered to the ABR client 134 prior to enabling a join of an associated multicast stream. Where a multicast stream with fragments associated with a requested content is in midstream, media fragments needed for initiating delivery to the client device may include segments currently being multicast or previously multicast. For example, if the multicast session is multicasting mid-stream the request content, the ABR client 134 may identify additional prior segments that are desired for playout of the video (e.g., a channel change event may require 3 most recent segments. The ABR client 134 may determine that it requires one or more earlier media segments in the requested content before playout may occur. For live adaptive bit rate streaming, the ABR client 134 may attempt to download the most recent media segments to fill out playout buffer, and most try to download the three or four most recent media segments and then play from the oldest segment in an effort to prevent playback stalls from occurring.

As disclosed, a plurality of intercepting multicast receivers 1002 may exist in the adaptive bit rate system. Each multicast receiver 1002 may include a respective local HTTP proxy 1003, and each intercepting multicast receiver 1002 may server a multicast group of ABR clients 134(*a*)-(*n*), intercepting multicast content from the multicast server 1001 and content requests from the ABR clients 134(*a*)-(*n*). The intermediate caching by the multicast receivers 1002 facilitates distribution of multimedia content from the origin server 130 to the requesting client 134.

As disclosed, an ABR client's request for content from the manifest file may pass through the local HTTP proxy 1003 in the MABR receiver 1002, which may receive the request and transmit it to the origin server 130. Disclosed herein are techniques for the ABR client 134 to receive content prior to the current multicast, as initiated by a serving multicast receiver 1002. Thus, rather than requiring ABR client 134 to send unicast requests 1010(*a*)-(*n*) to retrieve initial media segments (i.e., media segments prior to the currently available multicast segment) from the origin server 130 (which would occur way too frequently during channel change or ad-break periods), the multicast receiver 1002 intercepts requests 1011(*a*)-(*n*) and fulfills the requests when possible The ABR client 134 may receive requested media segments directly from local HTTP cache 1003 if present. If the cache 1003 does not have any matching media segments, HTTP media segment requests may be propagated by the multicast receiver 1003 all the way through transport network to remote ABR origin server 130. The ABR client 134 may use HTTP transfer to download each media segment URL.

In embodiments, the earlier segments are received at the lowest available encoded bitrate from the multicast receiver 1002 to determine if ABR client 134 can support timely delivery of higher encoded bitrates. However, it should be understood that the ABR client 134 may be agnostic to the source of segment data multicast to the ABR client 134 in response to its requests. For example, the ABR client 134 may be agnostic to the source of the segments received, whether the source is the multicast receiver 1002 or the adaptive bitrate server 1000. Thus, in embodiments, the source of a segment delivery to the ABR client 134 is transparent to the ABR client 134.

In implementations, there may be a separate MABR controller piece that orchestrates configuration between the MABR server 1001 and the MABR receivers 1002. Thus, an entity managing the MABR controller can manage configurations between the MABR server and MABR receiver.

Figure 1C:
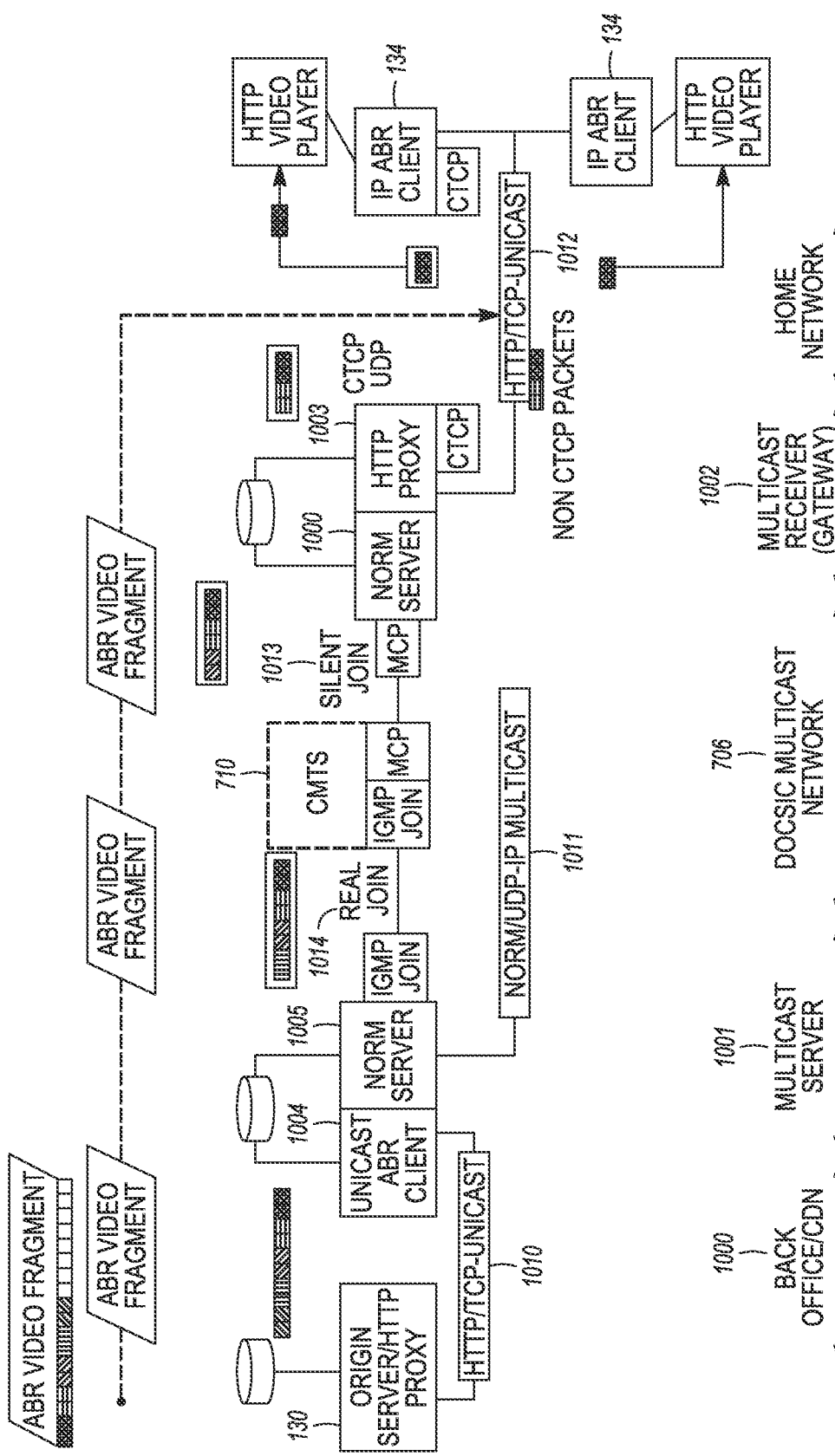
FIG. 1C depicts an overview of the architecture of an ABR system with an MABR server and MABR receiver elements for delivering ABR content to ABR clients.

FIG. 1C depicts an overview of an example architecture of an ABR system with an MABR server 10001 and MABR receiver elements 1003, 1006 for delivering ABR content to ABR clients 134, described in more detail below in FIG. 7. As depicted, components of the ABR system 1000 shown in FIG. 1B are a part of the content delivery network 1000. The MABR server 1001 is shown with a Unicast ABR client 1004 and Norm Server module 1005, and the MABR receiver 1002 includes a NORM client 1006 and an HTTP proxy module 1003.

As shown in FIG. 1C, the MABR server 1001 may include its own ABR client 1004 for retrieving ABR segments and doing a UNICAST→MULTICAST (1010→1011) operation. The MABR receiver 1002 performs the MULTICAT>UNICAST (1011→1012) requests, which includes collecting NORM multicast packets from multicast 1011, reassembling the ABR segment, and delivering the segment to the HTTP proxy/cache 1003.

As disclosed, the system may provide a stripped multicast playout of the plurality of media segments for which retrieval is needed. The multicast receiver 1002 may include an HTTP proxy 1003. The MABR receiver 1002 HTTP proxy 1003 may delay issuance of specific HTTP ABR media segment requests from ABR clients while waiting for receipt of the stripped multicast media segments. While receiving the stripped multicast media segments, the multicast receiver 1002 may deliver HTTP requests in queue to the local ABR client 134. The multicast ABR receiver 1002 may use knowledge of the master and media manifest requests to trigger MABR requests for a quick acquisition stream (QAS). The ABR media segments requests for content issued by the local ABR client 134 may be intercepted by the multicast receiver and delayed by the MABR HTTP proxy 1003 until a QAS delivers the ABR media segments. The QAS may contain a stripped sequence of current and previous media segments. Further, the QAS media segments may be at the lowest encoded bitrate.

As described herein, the HTTP proxy 1003 may download a complete unicast media segment that was not available via multicast since it was transmitted in a previous time interval. As part of the multicast receiver 1002, the HTTP proxy 1003 may assist in the interception of requests from the ABR client 134 destined for origin server 130. The HTTP proxy 1003 may get the MABR entity 1002 running with the specific ABR stream the HTTP request identified by identifying the specific ABR stream being requested, identifying from previously received ABR< >multicast mappings configuration which MABR and QAS multicast segments are available, and identifying the appropriate QAS stream.

The media segments collected may be stored in the HTTP cache 1003 for later use by other requesting ABR clients. The HTTP cache 1003 may be used to respond to lower resolution media segment requests.

In general, ABR clients 134 rely on HTTP traffic which can only be point2point UNICAST traffic. As disclosed, the operation of the Quick Acquisition Stream (QAS) enables delivery of previously multicasted ABR segments using the carousel approach of much lower bitrate versions.

The multicast receiver 1002 may have mapping information associating each ABR stream to a specific multicast group, e.g., group 134(*a*)-(*n*). The mapping info may associate ABR streams to specific multicast groups, collect multicast media segments, and prepare them in a local HTTP cache in the HTTP proxy 1003. An HTTP cache may be used to serve ABR media segment requests from ABR clients local to the receiver device, the MABR 1002 operating a local HTTP proxy 1003 configured with pattern matching rules extracted from mapping info previously received.

The multicast of the media segments may be accomplished using UDP with a robust protocol to deal with retransmissions that may occur. As described above, the multicast ABR (MABR) receiver devices are provided with mapping information to allow them associate ABR streams to specific multicast groups. The MABR receivers may register their interest in specific multicast groups (using a multicast group membership protocol).

Referring to FIGS. 1B and 1C, the MABR server is located upstream from the CMTS, and can be either in the CDN or just SOUTH of the CDN. It relies on the CDN for accessing the origin server 130 to retrieve ABR unicast content.

The MABR receivers 1002 may collect the multicast media segments and prepare them in a local HTTP cache, shown with the MABR receiver in the gatewayIt is noted that as used herein, the client device and cache are local in reference to each other, while being remote from the ABR system 1000. For example, the MABR receiver 1002 is located local to the client device 134, while the ABR client in the multicast server is located upstream or downstream from the client device and local cache. Generally the MABR receiver is in the home, and is downstream from the CMTS. In a DOCSIS network, the MABR receiver may be most appropriately located in a DOCSIS gateway device, upstream from the ABR client 134.

It is noted that in the case of a DOCSIS deployment the MABR receiver 1002 may never multicast data. In the case of the NORM protocol, there is a multicast retransmission scheme that can be used to update multiple joiners of the (S,G) if a receiver is missing a packet (thus stopping their own retransmission requests being issued). However in DOCSIS, it may not be possible to multicast data upstream and the retransmission approach relies on unicast instead of multicast.

In embodiments, the MABR receiver 1002 is embedded in a local gateway device that the ABR client is connected to or relies upon, as illustrated in FIG. 1C, the gateway offering services to every possible ABR client in a home. The multicast data the MABR receiver 1002 receives may be reassembled into ABR fragments that are cached in a local HTTP cache 1003. Any device that requests an ABR fragment, that is stored or otherwise available from the HTTP cache 1003, may be served that fragment from the home gateway.

Note that in some network transports (e.g., DSL), it may be preferable to locate the MABR receiver for serving multiple DSL gateways, i.e., locating the MABR receiver at an aggregation layer, e.g., where routers/switches connect to arrays of DSLAMs). In this mode, the "last mile" delivery would be unicast, while delivery from the multicast server could be just to the aggregation node(s)/routers.

As used herein, MABR is used in both the definition of the MABR server (the one that is responsible for requesting ABR data from origin servers and transmitting this data as a MULTICAST stream 1010) and MABR receivers 1002 (that issue multicast JOINs 1013, 1014 to request receipt of the MABR multicast data, and who reassemble the received data to recreate the original ABR data for UNICAST transmission 1012 to local ABR clients 134).

As used herein, the MABR server refers to the entity that performs the multicasting of ABR content. The MABR server 1001 may receive such ABR content for multicasting via another ABR client 1004 co-located with the MABR server. The MABR server 1001 performs the basic function (upon configuration) of requesting unicast ABR fragments (e.g., by using an internal ABR client 1004 within its software, or by accessing the actual native ABR fragments directly, e.g., using a WebDAV file system). The MABR server 1001 may then split up the large ABR fragment into many smaller MABR fragments that are multicast at 1010 to a specific multicast group address (i.e. (S,G) address, where the letter S represents the IP address of the source, and G represents the group address. Thus, the MABR server acts as two elements, an ABR receiver 1004 for receiving ABR fragments for a specific ABR video flow, such as receiving ABR fragments from an origin server, and a NORM transmitter 1005 that sends multicast traffic to the network on the S,G IP address. As shown in FIG. 1C below, the multicast server 1001 includes both the unicast ABR client 1004 and the NORM server 1005.

An MABR receiver 1002 interested in (S,G) joins the multicast session 1010 from the multicast server 1001, receives the multicast NORM data, processes the data (e.g., reassembly, error correction, retransmission recovery, etc), and then stores the received ABR fragments in a local HTTP cache 1003. The MABR receiver 1002 may join a multicast stream and reassemble the MABR fragments before unicasting them at 1012 to local ABR clients 134 that are requesting the associated data. For example, the MABR receiver 1002 may collect the multicast fragments, recover the original ABR fragment and push this into a local HTTP cache 1003. A local ABR client 134 requesting the same ABR video flow may also be serviced using unicast responses from the HTTP cache 1003.

In an example implementation, the local ABR client requests are intercepted using a transparent HTTP proxy function, checking to see if the request matches any cached ABR fragment; if a match is identified, the cached ABR fragment(s) is transmitted back to the local requesting ABR client. The HTTP cache can serve ABR media segment requests from ABR clients local to the receiver device. The MABR receiver 1002 may operate a local HTTP proxy 1003 that is configured with pattern matching rules extracted from the mapping information previously received. In implementations, the MABR receiver 1002 includes a NORM receiver 1006, an HTTP Transparent Proxy (not shown), and an HTTP Cache 1003, that are located together within a home gateway platform. It should be understood that the components may be devised in separate devices but may be included within the same hardware unit. Further, for an MABR receiver that receives NORM fragments and recovers the original ABR fragment, it is possible that the MABR receiver deposits ABR fragments in to a non-local HTTP Proxy gateway. If the HTTP Proxy 1003 is inspecting traffic for all incoming ABR HTTP GET REQUESTS then the HTTP Proxy may be primed with specific patterns to look for, that the MABR receiver may know about first. The HTTP Proxy 1003 in this example may push additional control signalling to the MABR receiver regarding the HTTP GET REQYEST to determine if the MABR receiver should issue a JOIN (S,G) to trigger the MABR collection process.

As described above, the local ABR clients 134 may receive the requested media segments directly from the local HTTP cache 1003 if they are present. In embodiments, the cache 1003 may respond to a client device 134 even when it does not have a completely reassembled media segment, e.g., the cache 1003 may only have started to receive MABR media segment data related to the content requested by the client. For example, in the case of the QAS where the stream will be delivered but has not yet been received, the client device in the NON-QAS scheme does not need to pass on the unicast request if the client device is aware that the client device will receive the fragment from the MABR. However if the cache does not have any matching media segments, the HTTP media segment request is propagated all the way through the transport network to the remote ABR Origin Server (or intermediate HTTP caches). Note that the receipt of the media segment via unicast will also be delivered into and served from the local HTTP cache in the event that another local ABR client requires that specific media segment. The HTTP cache is constantly maintained, and cached media segments are regularly removed from the cache in order to save cache space. The removal of media segments may be determined using configuration policy supplied to the MABR/HTTP cache subsystem.

The use of MABR can significantly reduce the amount of unicast bandwidth required to deliver ABR streaming of linear/live content. Multiple Service Operators (MSOs) that already deliver linear content using legacy MPEG2-TS based broadcast transport systems are able to take advantage of the broadcast/multicast nature of their transport networks to efficiently deliver ABR streaming using MABR. Traditionally, every ABR streaming session consumes single-use unicast bandwidth per ABR client. In a broadcast/multicast transport network, MABR transparently reduces the bandwidth demands of multiple unicast ABR clients watching the same linear/live content down to a single ABR bandwidth demand per broadcast/multicast domain.

However, currently the MABR solution does not cope with the initial startup unicast bandwidth requirements of ABR clients. Further, when compared to a linear MPEG/QAM delivery, the ABR client starting at the LOWEST resolution may take 2-3 segments of x segment duration to arrive at the main resolution.

These shortcomings are important as the initial startup bandwidth requirements exist every time an ABR client decides to switch from one ABR linear stream to another.

Note that even if an MABR stream is already being transmitted into the transport network, when a new MABR receiver wants to use multicast it is quite likely to have missed a portion of the currently multicast media segment, and will have to pass on a unicast request for this missing media segment, before being able to switch over completely onto the MABR stream. In this case the ABR client may end up having to get unicast delivery for three or four media segments. This statistic is not much by itself, but becomes a much greater concern when large numbers of ABR clients move in unison with each other, possible at linear program switching (e.g. when 6 o'clock news comes on) or during advertisement breaks (anywhere from 4 to 6 an hour). When providing an ABR based linear IPTV solution, this instantaneous unicast bandwidth growth can be significant depending on the number of subscribers.

As described in more detail below, the QAS may contain a stripped sequence of current and previous media segments, typically at the lowest encoded bitrate, though the disclosed techniques may be implemented for any resolutions. Normally the MABR system delivers the current media segment for an ABR stream during the segment duration (typically 2 to 4 seconds for live streaming). The multiple media segments associated with the QAS are delivered within the same segment duration, meaning that there could be four or five media segments delivered in this time frame. In embodiments, the arrangement of media segments delivered during each segment's duration is selected so as to ensure an MABR receiver has the greatest opportunity to retrieve three to four media segments without having to use unicast.

Figure 2:
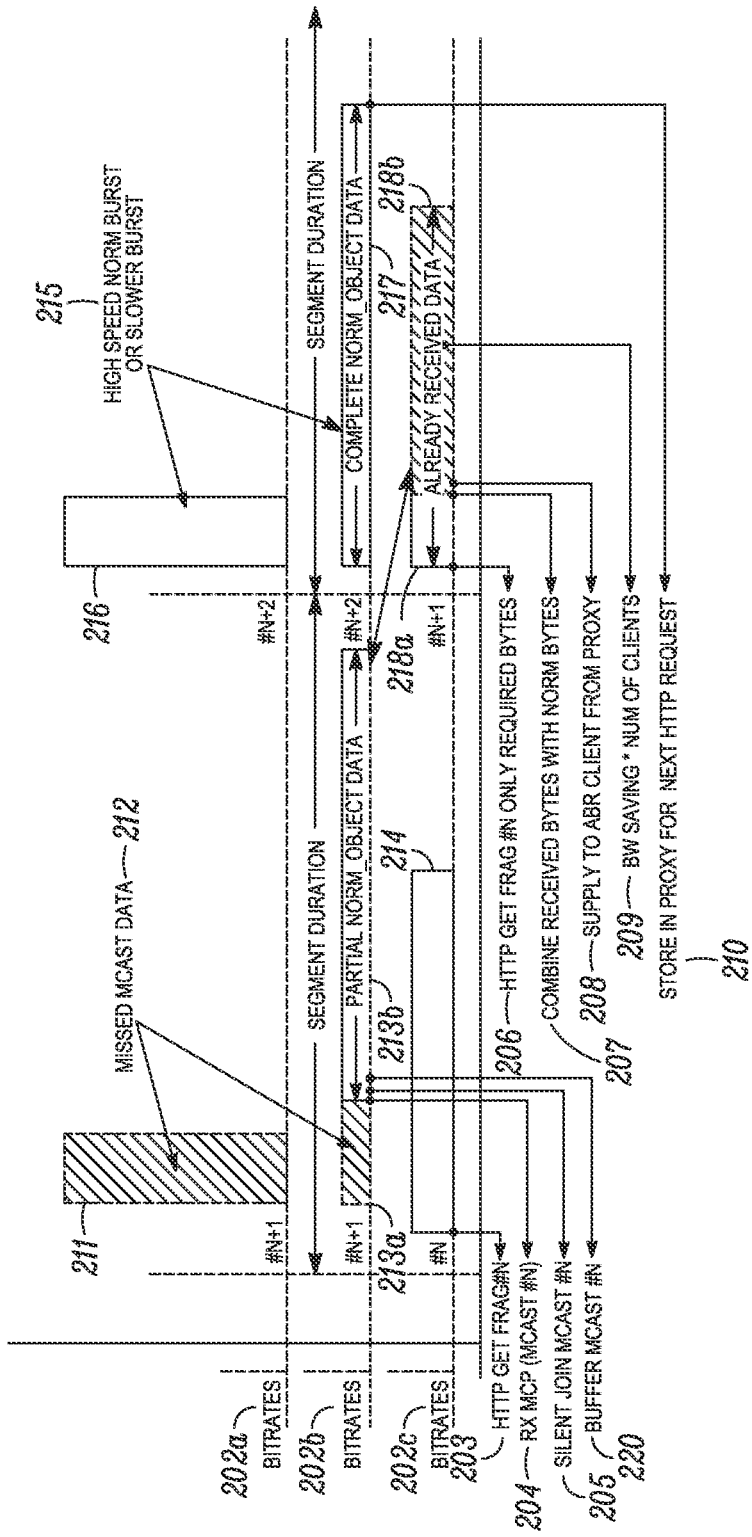
FIG. 2 illustrates a transition from unicast to multicast in an adaptive bit rate system.

FIG. 2 illustrates a transition from unicast to multicast in an ABR system. FIG. 2 depicts an example of a partial multicast data received in the current segment duration and how the partial multicast data can be utilized by sending a unicast request for the missing data. As described below, FIG. 2 exemplifies how the HTTP Proxy and the MABR entity can collaborate to minimize/exclude the requesting multicast data already received by the MABR entity through the use of targeted HTTP unicast range requests.

As shown in FIG. 2, three bitrate streams are identified, 202a, 202b, and 202c. The three different bitrates represent timelines for different transmissions in action. 202a refers to a much faster multicast transmit of a media segment, compared to 202b, which refers to a much slower multicast transmit of the same media segment. 202c refers to the unicast response of the same media segment to the HTTP Proxy. Thus for purposes of illustration, 202a represents a high speed multicast timeline, 202b represents a multicast timeline that is slower than 202a, and 202c represents a unicast timeline, For purposes of illustration, described below are examples described with reference to bitstream 202b, but it should be understood that alternate bitstreams may apply. As shown for bitstream 202b, the HTTP Proxy can interrupt its unicast download of media segment 218a, 218b by collecting the partial norm object 213b. The system may be configured to transmit at either the high speed transmission at 211, 216 or the lower speed transmission at 213a, 213b, 217.

The ABR client issues an HTTP GET request 203 for fragment Frag#n in response to the HTTP proxy forwarded unicast request for fragment #n 214 that occurs just before fragment #n+1 is multicast at 211 or 213a, 213b.

The Rx MCP (mcast #n) 204 represents the receipt of a mini carousal protocol (MCP) that carries a current list of available IP Multicast streams in the network. The Silent JOIN mcast #n 205 refers to the MABR simply starting to listen to the IP multicast data associated with the interested multicast stream, without having to issue multicast membership signaling. At 206, the MABR entity already knows that it partially received multicast data at 213b, and determines how much of the data the MABR was missing. The MABR forms a HTTP request for a byterange that covers the data from the start of the missing media segment up until the start of the received multicast data (already received). At 207, the HTTP Proxy combines the unicast response with the multicast data, resulting in a single media segment #n+1 being produced. In response to ABR client requests for segment #n+1, the HTTP proxy responds to ABR client requests for segment #n+1 with the combined unicast/multicast media segment at 208.

The bandwidth calculation represented at 209 represents a determination of how much unicast bandwidth was saved by combining HTTP unicast byterange requests with already received multicast MABR data. The MABR entity at 210 has managed to collect an entire media segment from multicast, and stores it in the HTTP cache for layer use by other requesting ABR clients.

The media segments depicted by 211 and 216 illustrate a media segment being multicast at a much higher bitrate 202a, but for a much shorter duration. The missed multicast data 212 is an example of data missed by the MABR entity at a point in time when it began listening for the multicast data. As shown in this example, if the data was being transmitted at the bitrate of the 211 media segment, the MABR missed out completely. In another example, assume that the system was transmitting the media segment at the much lower (but longer duration period) of the 213a media segment, and then the MABR entity would have been able to receive a partial media segment 213b. The media segment 213a defines the exact number of bytes not received by the MABR entity, whereas media segment 213b depicts the exact number of bytes received by the MABR entity.

The media segment 214 represents a complete unicast media segment #n that the HTTP proxy had to download (i.e., it was not available from multicast as it was transmitted in the previous time interval).

As described above, the system may be configured to transmit at either the high speed transmission at 211, 216 or the lower speed transmission at 213a, 213b, 217. The media segments 216, 217 at n+2 represents the same media segment that was transmitted at 2 different speeds 215, with higher speed bursting of the multicast segments 216. Thus, the media segment 216 is a high speed multicast of segment #n+2 (as compared to a slower version of the same data at 217). The media segment 217 is a low speed multicast of segment #n+2.

An amount of data at 218a represents the data requested by HTTP proxy using HTTP unicast byte range request. In embodiments, segment 213a and 218a represent the same missing MABR multicast data that the HTTP Get request 206 has determined must be requested. The data at 218b represents that data received by the MABR entity (213b). The data 218b is collated with 218a to form a complete media segment.

Referring now to 220, 220 illustrates buffering to demonstrate an embodiment for which it is essential to collect the MABR data, even if the start of the MABR data has been missed (see 213a). In an example embodiment, to allow the MABR entity to identify the details of the MABR data being transmitted, additional periodic information must be transmitted with the MABR data, providing details to the MABR data length, the URL it refers to, the bitrate, etc., which is data that can be used by the MABR entity to uniquely identify this media segment. Thus, in embodiments the buffering of multicast by the MABR entity at 220 is necessary. The data is buffered and the associated media segment is recovered, along with identifying information, such as corresponding URL, that is subsequently handed over to the HTTP Proxy to allow it store the media segment in the cache, and to be able to perform URL filtering to match incoming client ARB requests to the locally cached data.

Figure 3:
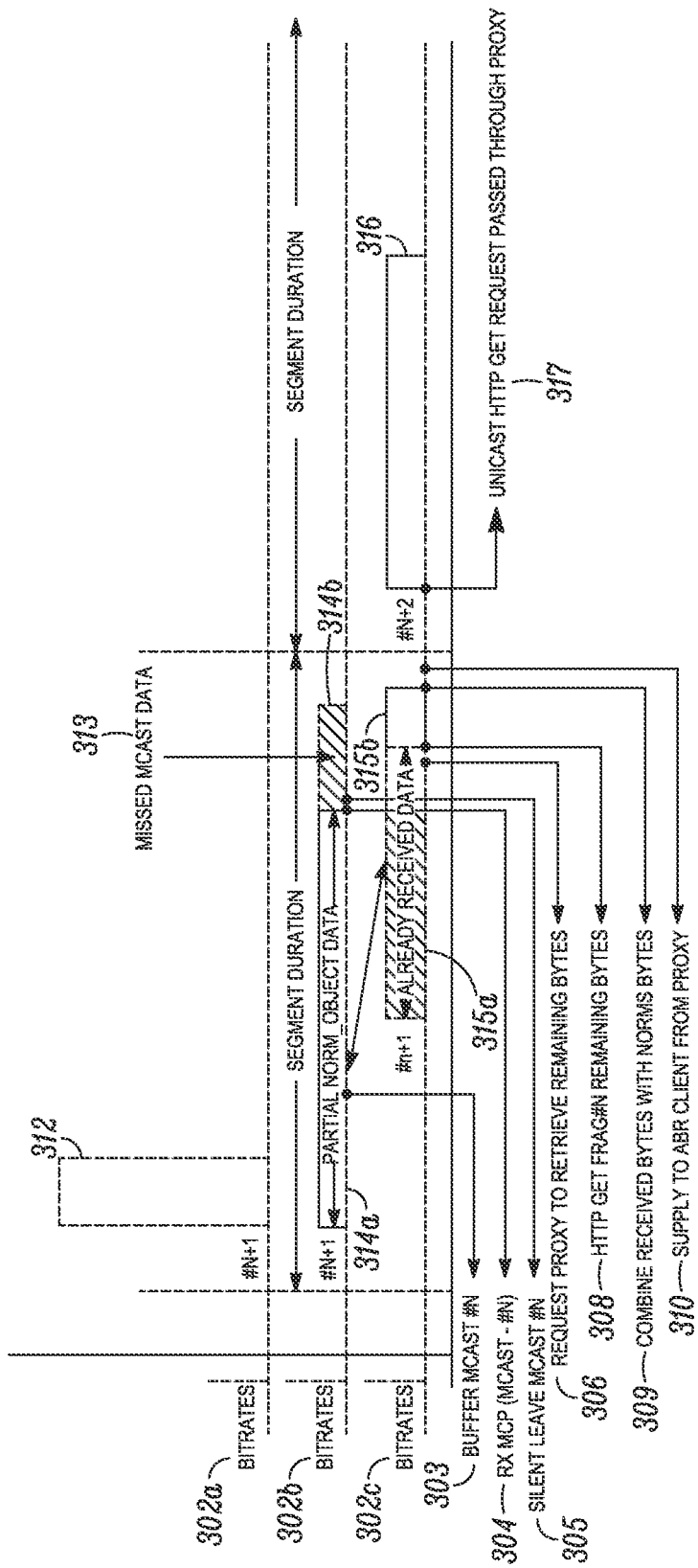
FIG. 3 illustrates a transition from multicast to unicast in an adaptive bitrate system.

FIG. 3 illustrates a transition from multicast to unicast in an ABR system. FIG. 3 demonstrates an embodiment in which the MABR entity relies upon the multicast data to fill the HTTP cache. As described below, the MABR entity may be suddenly interrupted as the multicast data stops. In this condition, the MABR entity can take advantage of recently buffered multicast data, and unicast request (byte range request) the missing multicast data. With the buffered multicast data, the MABR can issue only a unicast request (byte range request) to request the missing multicast data.

As shown in FIG. 3, three bitrate streams are identified, 302a, 302b, and 302c. Bitstream 302 represents a high speed multicast timeline. Bitstream 302b represents a slower multicast timeline. Bitstream 302c represents a unicast timeline.

At 303, the MABR entity, once joined to a multicast, constantly buffers the MABR data in order to reconstitute the transmitted media segment. The MABR entity receives an updated Mini Carousel Protocol (MCP) message at 304 that indicates that the MABR multicast stream has been removed. At 305, the MABR entity performs a silent leave, where it now no longer relies on the receipt of multicast data.

At 306, the MABR entity identifies how many missing bytes are required to complete the in-progress media segment (314a), and advises the HTTP proxy to issue a HTTP unicast byte range request for the missing data (314b). At 308, the HTTP proxy receives the missing data (315b) as a unicast response. At 309, the HTTP proxy reconstitutes the media segment 314a/315a (#n+1) with the newly received missing unicast data (315b). At 310, the HTTP proxy responds to ABR client requests for segment (315a/315b) #n+1 with the combined unicast/multicast media segment.

The high speed transmission of media segment #n+1 is represented by 312. Multicast data 313 never arrived at the MABR entity and is to be retrieved using a unicast byte range request. The multicast data received by the MABR entity from the slow bitrate multicast transmission is at 314a, and 314b is the notional missing data that prevented the MABR entity from producing a complete media segment (#n+1) from multicast data.

The data 314a is at 315a is effectively a copy of 314a data that has been passed to the HTTP proxy, so that it can combined 315b with it to complete the media segment, and the data 315b is the unicast range request data that the HTTP proxy has to retrieve to complete the media segment (#n+1). The data 316 represents the complete media segment #n+2 that was delivered to the HTTP proxy as a result of the unicast http get request at 317.

An HTTP proxy unicast get request 317 is issued for media segment #n+2. Following 317, the HTTP proxy receives all HTTP requests from local ABR clients, and proxies them through. Any data received by the HTTP proxy will be cached, allowing other local ABR clients to access that information if they subsequently request the same ABR stream.

It should be noted as well that in the case of the MABR multicast stream being stopped midflight and the MABR receiver having to switch back over to unicast streaming, the MABR receiver can close out on the current media segment by only issuing a unicast HTTP request for the missing segment bytes, as illustrated below.

As illustrated, it is desirable, particularly in the example edge cases shown in FIGS. 2 and 3, to maximize the use of the current segment being multicast. However, these still rely upon unicast HTTP requests to seek out performance, leading to increased unicast bandwidth.

Embodiments are disclosed that address a startup case of ABR clients, where three or four media segments must be retrieved as fast as possible before being able to utilize the MABR streaming option. Embodiments are disclosed that use a stripped multicast playout of the three or four most recent segments during the playout of a current MABR media segment. In embodiments, the MABR receiver HTTP proxy delays or suspends issuance of specific HTTP ABR media segment requests while waiting for receipt of the stripped multicast media segments. In embodiments, the HTTP Proxy holds off replying to the specific requests received until the stripped out segments are received; whereupon the HTTP proxy immediately replies to the waiting ABR client with the correct response. Thus, as the stripped out multicast media segments are received, the HTTP requests queued in the proxy are delivered to the local ABR client. It is noted that the MABR/HTTP proxy will know the difference (via configuration) as to when the stripped option is in use or not. When it is not in use, and the MABR Receiver/HTTP proxy identifies that the requested ABR fragments are not in the cache, and in some instances may never be multicast again, The MABR receiver HTTP proxy forwards the ABR UNICAST request up to the ABR server/ origin server to complete the request (passing the results on to the local ABR client).

It is noted that while three or four media segments are described as the requisite number of segments to be retrieved to be able to access a multicast stream, the number of requisite segments may be more or less. Currently, in HLS implementations, the HLS specification indicates that the client should not choose a segment which starts less than three target durations from the end of a playlist file. As disclosed herein, the QAS may end up transmitting the four most recent fragments during a current fragment duration (not just three), which would satisfy the HLS requirement. However, it should be understood that client devices may not follow or may ignore the HLS specification suggestion. For example, an HLS player may retrieve fragments from within the three most recent fragments, sometimes even starting with the most recent fragment.

In embodiments, the MABR receiver uses knowledge of the master and media manifest requests (requested by the local ABR client) to trigger MABR membership requests for Quick Acquisition Stream (QAS) for the request ABR stream. The ABR media segment requests issued by the local ABR client are intercepted and delayed by the MABR HTTP proxy until the QAS delivers the ABR media segments.

The QAS contains a stripped sequence of current and previous media segments, typically at the lowest encoded bitrate. Normally the MABR system delivers the current media segment for an ABR stream during the segment duration (typically 2 to 4 seconds for live streaming). The multiple media segments associated with the QAS are delivered within the same segment duration, meaning that there could be four or five media segments delivered in this time frame.

The arrangement of media segments delivered during each segment duration is selected to ensure an MABR receiver has the greatest opportunity to retrieve the three to four media segments without having to use unicast.

Figure 4:
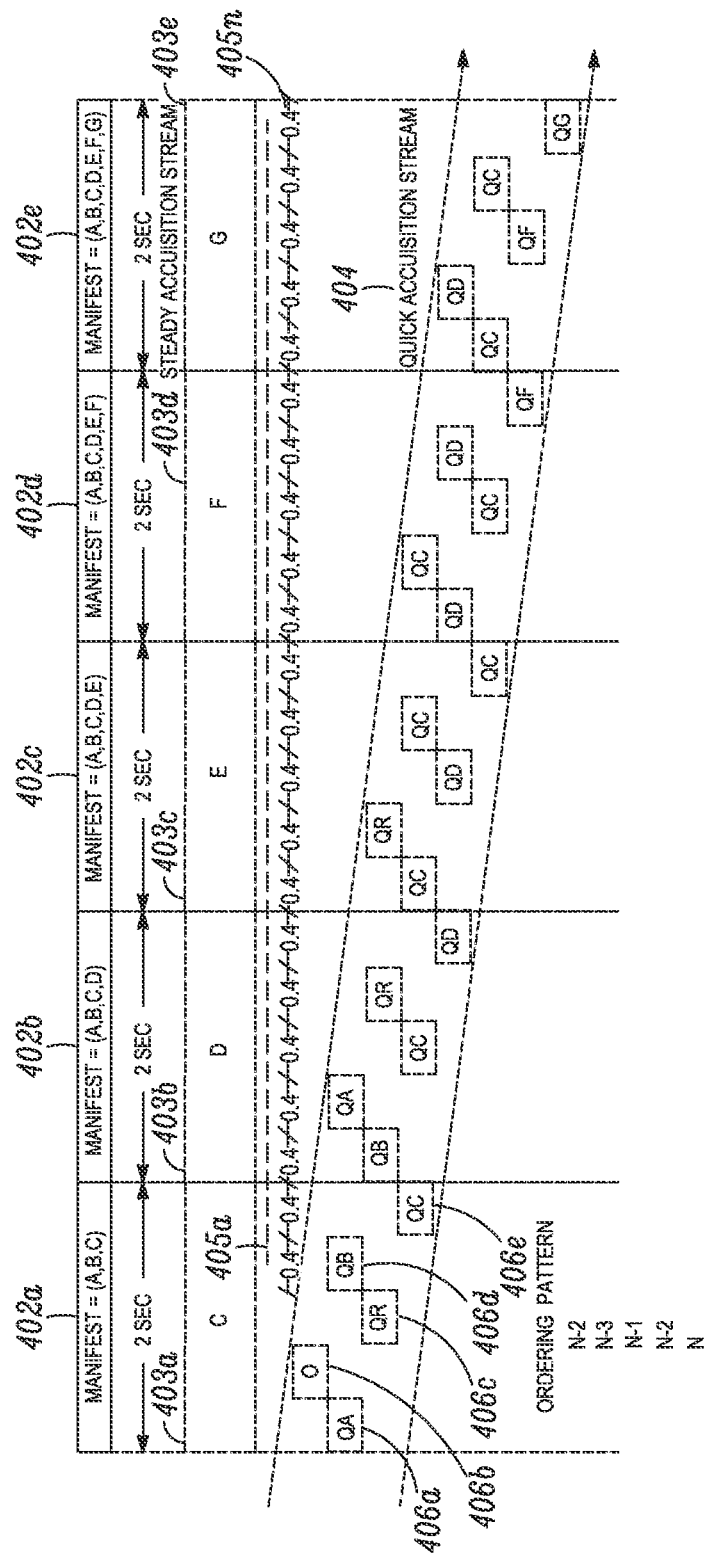
FIG. 4 illustrates an example multicast stream delivery in the disclosed adaptive bitrate system.

FIG. 4 illustrates multicast stream with segments with 2 second segment durations. The Manifest={A, B, C} 402a represents a manifest file identifying segments A, B, and C. As segment D becomes available, the manifest file is updated with segment D at 402b, and similarly updated at 402c when segment E is available, etc. As described, the multicast stream associated with each manifest 402a, 402b, 402c, 402d, 402e is streamed to reduce significantly the amount of unicast bandwidth that individual ABR client devices need to receive/display media content. For example, if 500 client devices are tuned to Channel #1, each client device could be consuming 1 Megabits of bandwidth for a unicast connection. Using a multicast representation of Channel #1, the bandwidth can be reduced to 1Megabits that all 500 users can access. However, if a client device requests a channel change or requests to join a stream that is not at the initial point in the manifest, the multicast solution does not allow or causes unacceptable delay for the client device to join the stream. For example, when a set top box changes a channel during 402a, the STB has already missed some of segments C and segments A and B have already been multicast. The STB needs all three segments, so the STB issues a unicast request. If a lot of client devices issue a unicast request at the same time, the resulting unicast burst of data consumes much of or exceeds the available bandwidth.

It is noted that joining a multicast stream via an explicit join by one or more subscribers. The notion of silent join is that a device is informed about the active list of multicasts (e.g., via a control plan message, possibly conveyed as a "carousel"), which allows clients to avoid having to perform explicit joins. The join by client devices to certain multicasts may be determined a priori based on heuristics determined by gathering channel change statistics over time, where an explicit join is not required by the client device.

Disclosed are embodiments for transmitting another set of unicast streams, cycling through the segment periods, such that when a client device changes a channel it only has to wait a short time to collect the fragments it needs to play the video. In other words, no unicast bandwidth request is necessary where the multicast tier with both a steady state stream and additional streams available for the channel change state. In embodiments, the additional shorter segment multicast streams eliminate the need for unicast bandwidth.

Referring to the first manifest file 402a shown in sequence in FIG. 4, segment C 403a has a duration of 2 segments. In this example, the segment durations are 2 seconds, but it should be understood that the segment duration may longer or shorter. In scenarios, if a client wants to join the multicast stream during the playout of segment C during 402a, the client must also get segments A and B. For example, a client is generally required to build up a sufficient buffer of segments to be able to contend with network congestion or packet loss. Without such a buffer, the client may "underrun" and run out of video data to playback while waiting for some future segments to be delivered. However, segments A and B have already been transmitted in the multicast stream and are no longer available to the client via the multicast data.

Disclosed herein is a Quick Acquisition Stream (QAS) technique for enabling a client device to join a multicast stream without significant delay. The encoder and fragmenter in the ABR packager 100 generate segments/fragments for each of the 2 second self-contained pieces of video. Thus, every 2 seconds in this example a QAS file is generated and transmitted as a multicast. The example QAS 404 depicted in FIG. 4 includes segments in 0.4 second durations.

As shown in FIG. 4, the highest encoded bitrate segment is delivered concurrently with the QAS that is delivering five 2-second segments of the lowest encoded bitrate. The ordering of QAS media segments is shown in the ordering pattern, where N is the current media segment being serviced. It is noted that the ordering presented for the 5 QAS fragments during a single fragment-duration may be used to help with the MABR gateway (GW) retrieving fragments from the QAS multicast fairly efficiently, and the spacing/number of repeated fragments helps on the multicast transmitter side.

With the introduction of MABR, once a fragment has partially been transmitted, then the MABR receiver may be unable to receive the rest of that fragment. The disclosed QAS techniques enable an MABR receiver to tune to a lower bitrate carousel of previously transmitted ABR fragments that can be used in place of passing up UNICAST requests to the origin server from the ABR clients (which would result in a bursted use or increase in unicast bandwidth demand. The disclosed QAS techniques may minimize or eliminate such bursted bandwidth demands.

In embodiments, if the QAS is generated with the main resolution, and the manifest file is adjusted to only show the MAIN resolution variant playlist, the delay may be less. In embodiments, the HTTP Cache may respond to a low resolution media segment request with a main resolution media segment response, thereby faking a response so the client receives a much better resolution media segment.

Further disclosed are techniques for a streaming approach of media segments that uses the same MABR delivery system described above, but providing a method for efficiently delivering media segments using MABR. An example implementation is described below where the ABR clients requires multiple (three to four) media segments to be received before play-out occurs, illustrating how the disclosed techniques can provide a method for efficiently delivering these using MABR.

ABR streaming relies upon providing media segments that have been encoded with different bitrates. The startup of most ABR clients results in the request of multiple (three to four) media segments, at the lowest available encoded bitrate (often the first bitrate listed in the manifest file) in order to discover network conditions in determine if the network can support the timely delivery of the higher encoded bitrates.

In the MABR system, the most recent media segment is multicast once it becomes available in the media manifest. Any ABR client will likely request the three previous segments and then the most recent segment. There is very little likelihood that the MABR receiver can use the current media segment being multicast when it joins the multicast, as it will have missed some portion of the start of the media segment.

In this scenario it is possible to have the MABR receiver perform a unicast HTTP request with a specific byte range covering the missing bytes of the current multicast media segment (rather than having to request the entire media segment). The MABR receiver can make a decision on this based on the percentage of already received multicast media segment data. However, this unicast HTTP request for the higher encoded bitrate media segment could have a significant impact on unicast bandwidth demands in the transport network compared to requesting the lower encoded bitrate.

In embodiments disclosed, an MABR receiver uses knowledge of the master and media manifest requests (requested by the local ABR client) to trigger MABR membership requests for Quick Acquisition Stream (QAS) for the request ABR stream. The ABR media segment requests issued by the local ABR client are intercepted and delayed by the MABR HTTP proxy until the QAS delivers the ABR media segments.

It is noted that external policy decisions may dictate which ABR streams will be made available as multicast streams, and this information can be made available to all MABR receiver devices.

Figure 5:
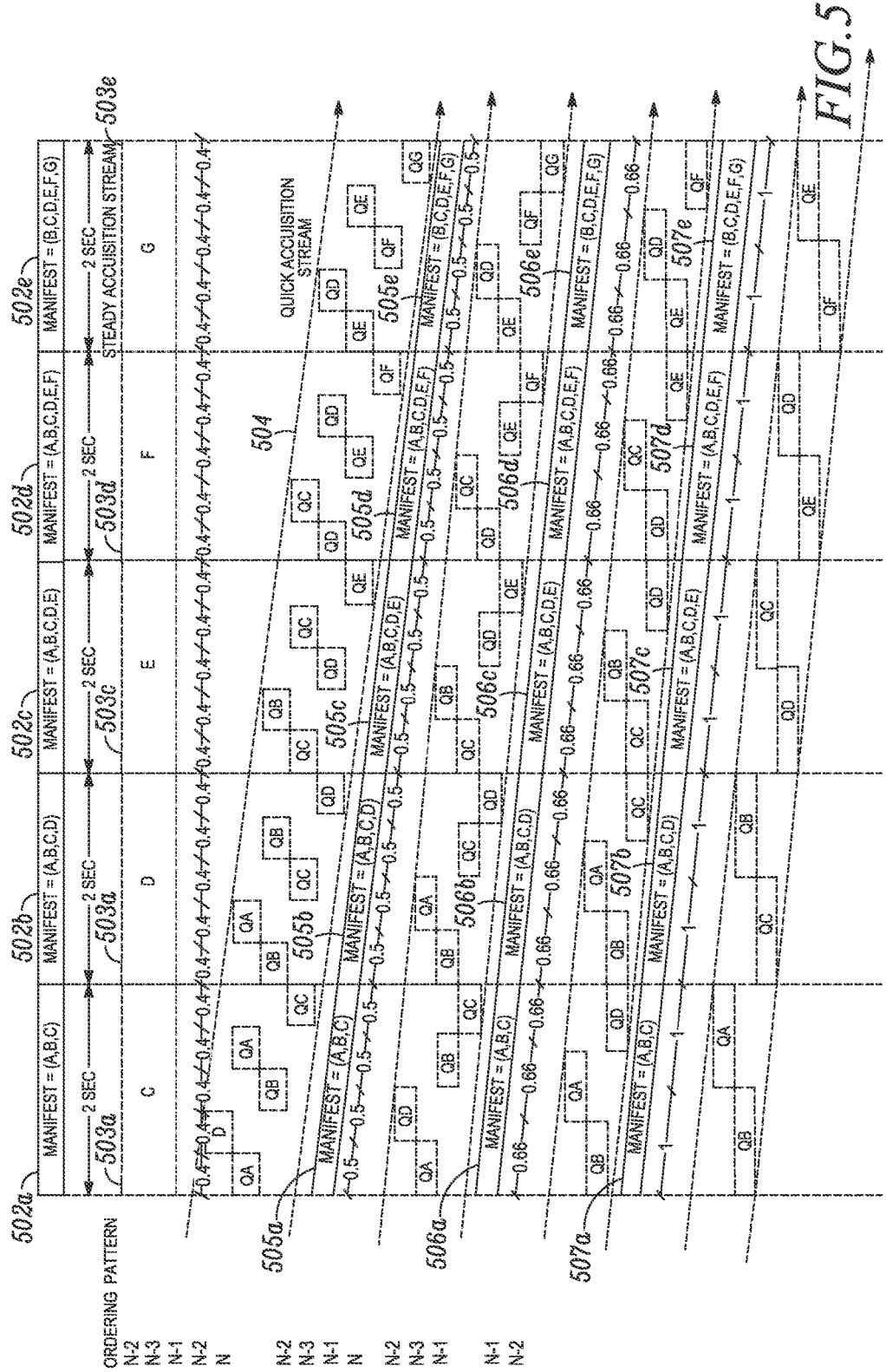
FIG. 5 illustrates multiple example multicast stream deliveries in the disclosed adaptive bitrate system with varying segment durations.

Multiple stripping patterns and number of QAS segments per segment duration can be used. FIG. 5 depicts several examples represented by 505a-e, 506a-e, and 507a-e with varying segment durations. For example, FIG. 5 shows several examples, starting at 5 fragments per duration down to just 2 fragments per duration for the QAS stream. The ordering may be selected to optimize the MABR gateway (GW) retrieving the most recent (e.g., last three or four segments) fragments quickly, without the otherwise longer delay to retrieve the segments.

While ABR video is normally unicast between the origin server and the client, the disclosed techniques use a master manifest file that identifies a plurality of different bit rates (variant manifest files) that may be multicast to a plurality of ABR clients. When a client trying to stream the content, the client typically starts with the lowest bit rate manifest to quickly retrieve the content, and then update to a higher bit rate based on an analysis of the system resources.

In embodiments, higher resolution fragments are transmitted instead of lower resolution fragments. The tradeoff is an increase in bandwidth while allowing the client to jump to the higher or maximum resolution faster. For example, the higher resolution could be transmitted using the quick acquisition stream (QAS) approach disclosed herein, in addition to the higher resolution fragments being delivered on the normal or baseline multicast transmission.

As disclosed, the multicast ABR receiver can deliver ABR video flow and also allows users to request ABR fragments by delivering over a multicast stream to a local cache. The multicast is normally streamed at the highest bit rate, so the client device can pull segments directly from a local gateway cache. In embodiments, the source of the fragments is transparent to the client device. Thus, ABR is still used, but one of the bit rates is being delivered to a local cache that is closer to the client. The client still makes requests as in a conventional ABR system, but the local cache or gateway provides access to a bit rate, e.g., the highest bit rate, and a local stream. Pre-caching may be done based on predictions of content that will be requested, thereby pre-caching the local/gateway cache for quicker access by the client devices (e.g., a highly anticipated athletics event content (e.g., Olympics, a championship athletic event, a government official's speech) may be delivered to the local gateway cache and is made available, even if client devices with access never request the content).

In embodiments, an ordering of the QAS segments is used to ensure that an MABR receiver joining at any specific time during the current MABR media segment multicast can retrieve the necessary segments within a fixed time.

Figure 6:
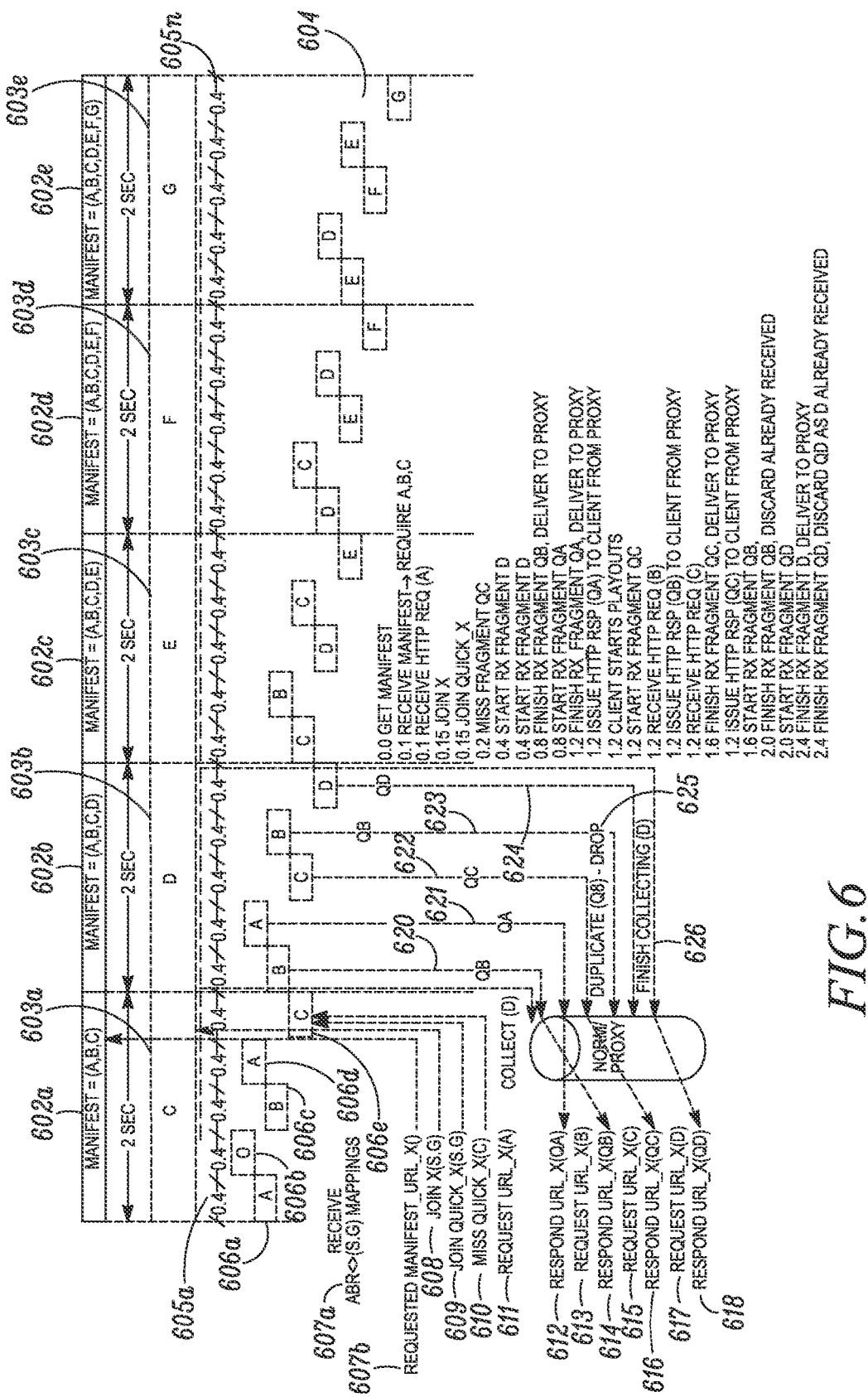
FIG. 6 illustrates an interaction between a multicast receiver and requests for an adaptive bitrate stream in an adaptive bitrate system.

FIG. 6 illustrates the interaction between the MABR receiver and the requests for the ABR stream (including manifest request). Manifest files 602a-602e depict the manifest files associated with a content; the manifest file is updated with segments as they become available. FIG. 6 illustrates an example series of events an embodiment of the use of the QAS goes through in order to avoid unicast traffic requests being forwarded from the ABR client through the HTTP proxy to the network.

For purposes of illustration, FIG. 6 depicts an example time sequence chart covering multiple 2-second segment boundaries. At the start of each boundary a new manifest file is output, listing a newly created media segment. Note that the total bandwidth consumed by the QAS stream in this example is based on a number of variables. A) the duration the QAS stream is present, B) the duration of each media segment, C) the bitrate of the QAS media segments, D) the number of QAS media segments transmitted per (B).

In the case of a 14 second QAS stream transmission, with 2 second media segment duration, transmitting 1 Mbps media segments (for a total of 2 Mbps per segment duration), for 5 QAS media segments per duration, the overall bandwidth consumed is $((A)/(B))*(C*B)*D=70$ Mbps total or an additional 5 Mbps extra for 14 seconds. If 100 clients change channel during the 14 second interval, the total bandwidth consumed would be 100*3*1=300 Mbps total or an additional 21 Mbps for 14 seconds (i.e. over 16 Mbps more) FIG. 6 depicts an example of the disclosed multicast adaptive bitrate receiver techniques for accessing prior data on behalf of one or more ABR clients. It is noted that manifest files 602a-e represent each manifest file and/or updated manifest file produced at the start of each new 2 second boundary, including a reference to the actual segment (a,b,c,d,e,f,g). The manifest file is continuously updated with media segments as they become available. For example, 602a represents the manifest file when segments A, B, and C are available, and manifest file 602b represents an updated manifest file that now also includes segment D.

The media segments 603a-e each represent a current media segment being multicast by the MABR solution during the respective time period or segment duration. In an example, the segment durations are 2 seconds long. Thus, during the time period or segment duration at 603a, segment C is being multicast to ABR clients in the multicast ABR receiver's multicast group. Even though each duration represented by 603a-e is illustrated to extend for the duration of the 2-second segment duration, the delivery of each media segment may vary depending on the bitrate (e.g., the duration may be shorter where the bitrate of the media segments is higher).

Segments 606a-606e depict an example of transmitting quick stream segments during the multicast of a current media segment, illustrating that a plurality of segments may be quick streamed during the multicast of the current media segment. For illustrative purposes, 0.4 second intervals are between 605a-n, each interval relating to ⅕ of the two segment duration for the current multicasting media segment C, and each interval corresponding to five segment (e.g., segments 606a-6060e) transmissions that occur per two segment duration. As described above, the quick stream segments may be streamed in a particular order or pattern. Quick stream segments 606a-e portray an example cyclical pattern that is being used to transmit the segments via a QAS stream. In this example, 4 unique segments are transmitted during this interval, with segment A (606a/d) being repeated twice. The ordering pattern for segment n is (n−2, n−3, n−1, n−2, n). Overall, each segment transmitted using the five-segment instance of this QAS scheme is transmitted a maximum of 5 times, as shown by the full depiction via this QAS scheme of the transmission of segments C and D. Even though the QAS segments are presented in the diagram as extending for a 0.4 second duration (605a), this is purely illustrative; the QAS segment may be transmitted at a much higher bitrate resulting in a much shorter transmission time. It is also possible that the QAS media segments can be taken from any of the available bitrates presented in the ABR manifest, including the highest bitrate.

The multicast ABR receiver may receive at 607a an ABR< >MABR Multicast mapping(s) that may inform the MABR which segments and/or streams are available as an MABR multicast or QAS multicast.

At 607b, the MABR may receive a client ABR request for a corresponding manifest file for an ABR stream of interest.

In response to the receipt of the ABR< >MABR multicast mapping(s) and the data received in the MABR mappings information, the multicast ABR receiver may request to join a multicast quick stream at 608. Note that the join is shown occurring at an interim point in the multicast of segment C, which is after the start of the multicast transmission of segment 603a. Thus, the MABR entity cannot receive this media segment C since it was already transmitted or partially transmitted.

In order to provide an ABR client with the proper segments of the requested stream, such as segment C which is already being multicast and prior segments to increase the quality of the startup and playout of the stream at the ABR client, the multicast ABR receiver requests to join a quick stream multicast. In response the manifest file received at 607b, and the data received in the MABR mappings information, a quick stream multicast session is joined. At 610, the MABR entity identifies that the initiation point of the QAS stream received by the MABR receiver is at an interim point of a QAS media segment, and therefore the MABR receiver did not receive a complete segment at the start of the quick stream multicast session. This partial segment may be discarded.

By 611, assume that the ABR client has retrieved the ABR Manifest file, determined the required media segments to request, and issues its first request for the media segment, e.g., media segment A. The HTTP Proxy receives this request and queues a response pending the receipt of the QAS media segment. For example, at 612, once the MABR entity has fully received QAS media segment A (621) it passes this to the HTTP proxy who responds to the ABR client request at (611) with the transmission of quick segment A.

It is noted that the ABR client may not need to retrieve all segments for a particular stream that extend to the beginning of the stream, but at least enough to sufficiently playout segments at the ABR client with buffering options and a more seamless playout. In this example, because the request for the content is made while media segment C is currently multicasted, the ABR segment requests receipt of content beginning at segment A so as to have 2-3 segments in queue.

At 613, the ABR client requests media segment B. Based on this QAS stream arrangement, quick stream segment B was received prior to quick stream segment A. Thus, at 614, since the MABR entity has already received QAS media segment B (620) and delivered quick stream segment B to the HTTP Proxy, the HTTP proxy is able to immediately reply to the ABR client by transmitting segment B.

Similarly, at 615 the ABR client requests the next media segment C. At 616, the MABR entity has already received QAS media segment C (622) and delivered this to the HTTP Proxy, and thus the HTTP proxy is able to immediately reply to the ABR client by transmitting segment C.

At 617, the ABR client requests the next media segment D. Assume that at the point of the request for segment D, the MABR entity has received the MABR media segment (603b) and decides to deliver the MABR media segment to the HTTP proxy such that the HTTP proxy may immediately reply to the ABR client with the segment 603b rather than the quick stream segment D. Thus, at this point the MABR entity has managed to transition to the MABR media segments successfully and no longer requires access to the QAS stream. Thus, the MABR entity can leave the QAS stream.

In accordance with the QAS stream arrangement depicted in FIG. 6 for purposes of illustration, the segments are quick streamed during the receipt of segment D 603b in an order of segment B, segment A, segment C, segment B, and segment D. This QAS arrangement is explained here to provide examples of how each quick stream media segment may be processed by a multicast ABR receiver. QAS media segment B 620 is transmitted to the network, and collected by the MABR entity; it is subsequently delivered to the HTTP Proxy, and serves as the response to 614. QAS media segment A 621 is transmitted to the network, and collected by the MABR entity; it is subsequently delivered to the HTTP Proxy, and serves as the response to 612 QAS media segment C 622 is transmitted to the network, and collected by the MABR entity; it is subsequently delivered to the HTTP Proxy, and serves as the response to 616. QAS media segment B 623 is transmitted to the network, and collected by the MABR entity; it is identified as a duplicate to (620) and subsequently dropped (625). And, QAS media segment D 624 is transmitted to the network, and collected by the MABR entity. However, in this instance, because the MABR entity has already begun to receive MABR media segment (603b), the MABR may discontinue collection of the QAS media segment D (624). At this point the MABR entity may cease the collection of the QAS stream, and may leave the QAS multicast (618 comment);

The drop of quick stream segment B at 625 illustrates an example whereby the MABR entity identifies that it has already received the same QAS media segment (620) as it is currently receiving (623), and decides to no longer collect that segment 623 (i.e. it drops it). At 626, an example of the completion of collection of quick stream segments by the MABR is depicted, in which case the MABR entity may successfully receive the entire MABR media segment (603b) and delivers this to the HTTP Proxy. The QAS stream, if continued, is illustrated by 604 to illustrate the pattern that would be continued if the MABR entity were to remain joined to the multicast quick stream. The continued QAS stream as shown at 604 illustrates how the QAS stream may be continued and what quick stream segments would be available during the multicast or available multicast of segment G 603e.

The use of the QAS stream option allows the MABR receiver to pick out the requested ABR media segments without having to resort to using unicast HTTP requests. The above example shows how the MABR receiver can supply the requested media segments to the requesting local ABR client within 1.2 seconds without having to resort to any unicast media segment retrieval.

The QAS option allows flexibility in terms of the stripping pattern and number of previous media segments to transmit. The stripping influences how much delay the MABR receiver may experience while holding back HTTP proxy requests.

The QAS option adds an additional multicast membership join to the processing stages of starting an ABR stream.

Figure 7:
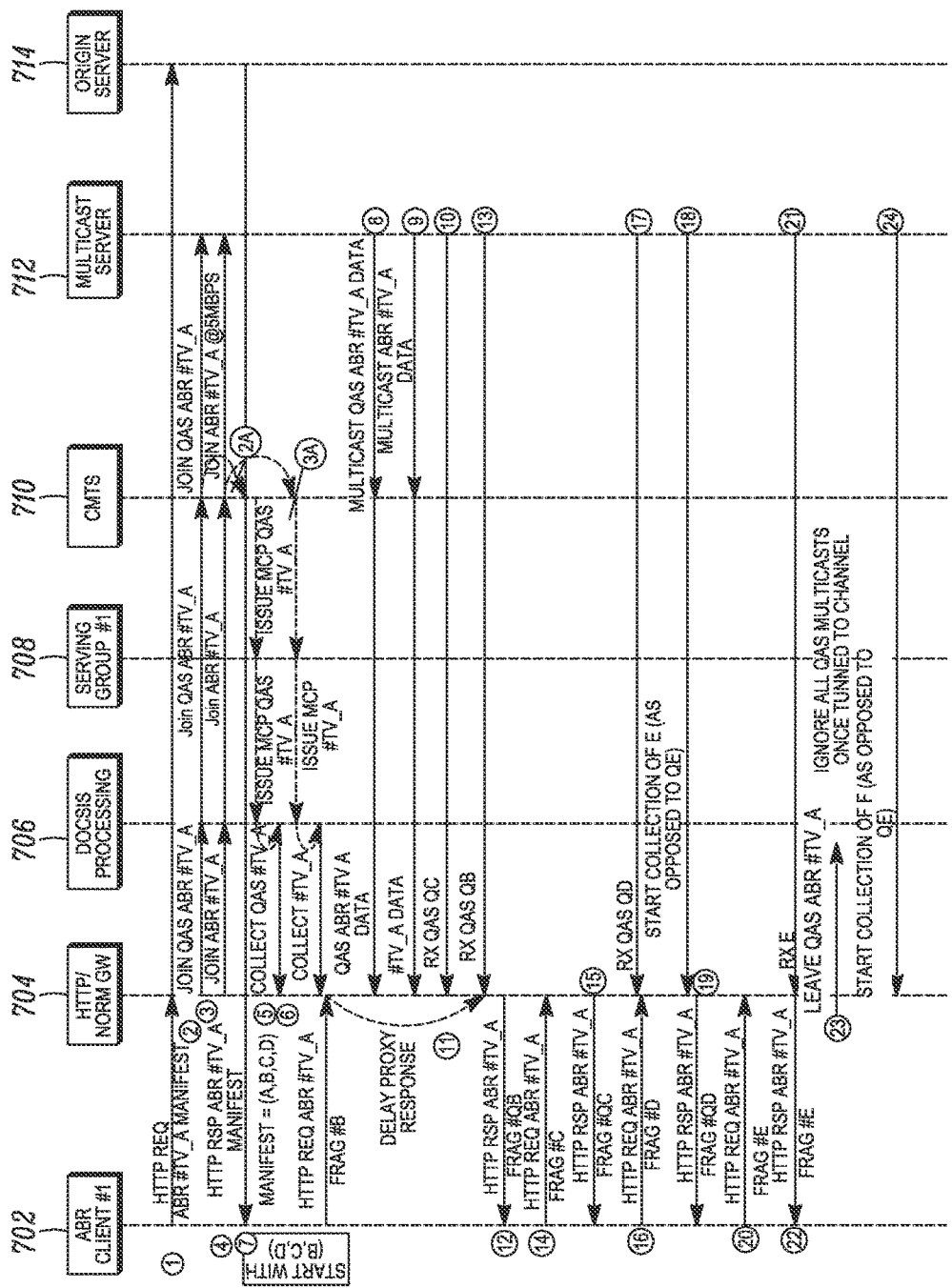
FIG. 7 depicts a flow diagram illustrating the interactions between an adaptive bitrate client, a multicast adaptive bitrate receiver and a cable modem termination system in the case of a Data Over Cable Service Interface Specification (DOCSIS) transport network.

FIG. 7 depicts a flow diagram illustrating the interactions between the ABR client, the MABR receiver and a cable modem termination system (CMTS) in the case of a DOCSIS transport network. The sequence shown in FIG. 7 illustrates the primary elements involved in a DOCSIS network for delivering the Multicast ABR solution. The sequence in FIG. 7 closely follows the sequence identified in FIG. 6, but provides more of a system wide context to the actions of the various elements.

At 1, the ABR client #1 issues a request for a media segment, in the form of an HTTP Req, e.g., ABR #TV_A Manifest. The ABR client 702 issues HTTP request for bitrate manifest file, which passes through the HTTP Proxy/ NORM GW element 704. The HTTP/Norm gateway 704 receives the HTTP req and transmits it to the origin server 714, thereby forwarding it out to the Origin Server 714. Identified from the HTTP request (1) the specific ABR stream being requested 704, and identifies from the previously received ABR< >Multicast Mappings configuration, what MABR and QAS IP multicast are available.

As further depicted in FIG. 7: At 2: the MABR entity joins the QAS multicast streams, triggering DOCSIS processing in the DOCSIS GW (706) and CMTS processing (710) to be performed. For example, the MABR Receiver entity issues a JOIN for the QAS stream. Thus, at 2, the MABR receiver has joined two separate multicast streams, the main MABR stream AND the QAS Multicast stream. The MABR receiver does not itself transmit multicast traffic. The MABR receiver function is to join a multicast and take the received multicast data fragments and reassemble into ABR fragments. The CMTS issues multicast joins for the QAS multicasts, which are delivered to the network between the CMTS and the Multicast Server.

At 2a: the CMTS (710) reacts to the multicast join for the QAS stream, resulting in an updated Mini Carousel Protocol (MCP) list of available IP multicasts to be delivered back to the GW DOCSIS processing (706)

At 3: the MABR entity joins the MABR multicast streams, triggering DOCSIS processing in the DOCSIS GW (706) and CMTS processing (710) to be performed. The CMTS issues multicast joins for the MABR multicasts, which are delivered to the network between the CMTS and the Multicast Server (712)

At 3a: the CMTS (710) reacts to the multicast join for the MABR stream, resulting in an updated Mini Carousel Protocol (MCP) list of available IP multicasts to be delivered back to the GW DOCSIS processing (706)

At 4: The origin server (714) delivers the Manifest response to the ABR client, consisting of the most recent set of ABR segments At 5: the DOCSIS processing (706) processes the received MCP update and begins to collect the QAS multicast data At 6: the DOCSIS processing (706) processes the received MCP update and begins to collect the MABR multicast data At 7: the ABR Client (702) issues a HTTP request for Fragment B (3rd older fragment in manifest)

At 8: multicast server (712) QAS multicast stream is multicast through the network the CMTS (710) and on to the GW HTTP/NORM GW (704)

At 9: the multicast server (712) MABR multicast stream is multicast through the network the CMTS (710) and on to the GW HTTP/NORM GW (704)

At 10: the MABR entity in 704 receives the QAS media segment qC and passes this to the HTTP proxy in 704

At 11: the HTTP Proxy in 704, delays a response to the Client ABR request (7) until the QAS media segment is received by the MABR entity and delivered to the HTTP proxy.

At 12: the HTTP proxy delivers the collected QAS media segment qB to the ABR client At 12a: the line at 13 should occur before step 12 . . . .

At 13: the Multicast Server (712) transmits the QAS media segment qB to the network (which is delivered all the way to the interested gateways)

At 14: the ABR client issues a request for the next media segment in the manifest (C) to the HTTP Proxy (704)

At 15: as the HTTP Proxy (704) already has QAS media segment qC (10), it responds immediately to the ABR client (702)

At 16: the ABR client issues a request for the next media segment in the manifest (D) to the HTTP Proxy (704)

At 17: the Multicast Server (712) transmits the QAS media segment qD

At 18: the multicast server (712) transmits the MABR media segment E

At 19: the HTTP Proxy (704) responds to the ABR client request (16) with QAS media segment qD At 20: the ABR client issues a request for the next media segment in the manifest (E) to the HTTP Proxy (704)

At 21: the Multicast Sever (712) completes the transmission of MABR segment E At 22: the HTTP proxy (704) responds to the ABR client (702) with the MABR media segment E (as opposed to the QAS media segment qE)

At 23: the HTTP proxy/MABR entity (704) leaves the QAS media stream and notifies its DOCSIS processing (706). This gets propagated up to the CMTS (710)

At 24: the MABR entity continues to receive subsequent MABR media segments from the Multicast Server (712) and delivers these to connected ABR clients (702)

Figure 8:
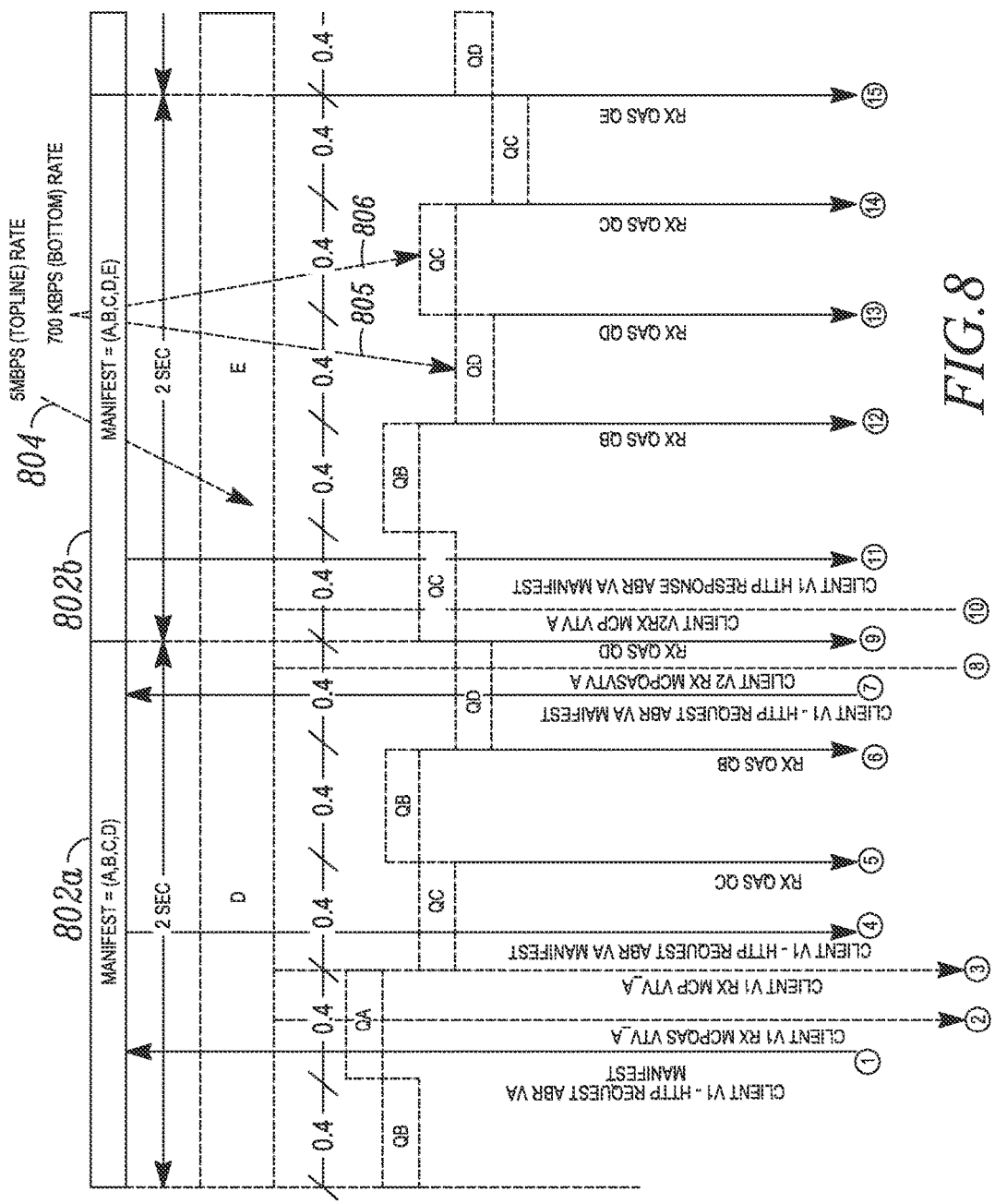
FIG. 8 illustrates example messaging from a multicast membership perspective when attempting to access a multicast receiver and quick stream multicasts.

The flow diagram depicted in FIG. 7 may be paired with FIG. 8 which depicts how the various MABR segments may be delivered over time to match with the Rx QAS qXX references shown in FIG. 7. Note that other than the unicast HTTP requests for master and media manifests, all media segments are delivered using MABR.

FIG. 8 illustrates example messaging that may be required from a multicast membership perspective when trying to access the MABR and QAS streams, in the presence of the Mini Carousel Protocol (MCP) delivering IP multicast membership details.

Manifest file 802 is shown in FIG. 8 at two different points in its sequence, at 802 with segments A, B, C, and D and again at point 802b updated with segment E. As will be described by the process below, 802a defines the manifest (A, B, C, D) and segment (D) delivered during a 2 second interval, 802b defines the manifest (A, B, C, D, E) and segment (E) delivered during another 2 second interval.

At 1, the client makes the HTTP request for a manifest file for content. As further illustrated by FIG. 8:

At 1: ABR client#1 issues a HTTP request for manifest file. At this point the HTTP proxy intercepts the HTTP request, and gets the MABR entity running with the specific ABR stream the HTTP request was for.

At 2: the MABR entity and DOCSIS processing picks up on the MCP with the list of available Multicast Memberships, and identifies the QAS multicast stream. It begins to buffer subsequently received QAS multicast data At 3: the MABR entity and DOCSIS processing picks up on the MCP with the list of available Multicast Memberships, and identifies the MABR multicast stream. It begins to buffer subsequently received MABR multicast data At 4: ABR client#2 is proxied on the response to its HTTP request for the ABR manifest file At 5: the MABR entity completes the reception of QAS media segment qC, and passes this to the HTTP Proxy At 6: the MABR entity completes the reception of QAS media segment qB, and passes this to the HTTP Proxy At 7: ABR client#2 issues a HTTP request for manifest file. At this point the HTTP proxy intercepts the HTTP request, and gets the MABR entity running with the specific ABR stream the HTTP request was for.

At 8: the MABR entity and DOCSIS processing picks up on the MCP with the list of available Multicast Memberships, and identifies the QAS multicast stream. It begins to buffer subsequently received QAS multicast data At 9: the MABR entity completes the reception of QAS media segment qD, and passes this to the HTTP Proxy At 10: the MABR entity and DOCSIS processing picks up on the MCP with the list of available Multicast Memberships, and identifies the MABR multicast stream. It begins to buffer subsequently received MABR multicast data At 11: ABR client#2 is proxied on the response to its HTTP request for the ABR manifest file.

At 12: the MABR entity completes the reception of QAS media segment qB, and passes this to the HTTP Proxy, which discards it as it has already been received At 13: the MABR entity completes the reception of QAS media segment qD, and passes this to the HTTP Proxy, which discards it as it has already been received At 14: the MABR entity completes the reception of QAS media segment qC, and passes this to the HTTP Proxy, which discards it as it has already been received At 15: the MABR entity completes the reception of QAS media segment qE, and passes this to the HTTP Proxy.

The MABR media segment during the 2 second interval shown is associated with the bitrate (5 Mbps) 804. The bitrate shown as 700 Kbps shown at 805 is associated with the QAS media segment qD transmitted during this interval, and the bitrate 700 Kbps shown at 806 is also associated with the QAS media segment qE transmitted during this interval Like the normal MABR media segment transmission, the MABR server is responsible for creating the QAS stream. For example, the MABR server sets up the specific Multicast Group (S,G), as well as requesting lower quality ABR fragments continuously. The MABR server would then keep a copy of each of the received unicast ABR fragments and play them out as described herein. Once a fragment is not required for further playout, that fragment may be removed from the MABR server. is the QAS stream may be configured with the desired segment pattern and number of segments to repeat per segment duration. It is responsible for any retransmissions that may occur during the receipt of the QAS stream. In all other regards, it treats the QAS stream like any other MABR stream.

Once the MABR receiver has managed to transition to receiving the highest encoded bitrate media segments, it no longer needs the QAS stream, so it leaves the associated multicast.

Note that the QAS concept has applications beyond the handling of ABR stream startup. It can also be used for other applications like presenting live channel mosaics as part of a program guide provided to subscribers.

Note the use of the disclosed QAM stream may be policy based. In embodiments, the controller device determines on what MAIN programs a QAS should be transmitted with. Such a policy may also switch the QAS on or off for other multicast programs over time (allowing for a more dynamic application of when the QAS could be employed).

The QAS may be employed to address the "short tail" concept, where the transmission of extra multicast traffic for a short duration around popular "channel change epoch" would save significant amounts of UNICAST bandwidth. The cyclic transmission of the most recent 3-4 fragments just before, through, and after the "channel change epoch" would allow Multicast ABR gateways/clients from having to resort to UNICAST bandwidth at all (with the exception of requesting HLS manifest files).

The QAS can be coupled with "Silent Joins" to reduce the need for Multicast ABR (MABR) gateways from having to issue IP Multicast Membership messages (joins/leaves), reducing the impact of such messaging on northbound routers (e.g. CMTS platforms).

QAS may also be used for long tail TV channel, where an explicit IP Multicast Membership join request may be issued for the QAS by the MABR gateway, as part of the initial channel change process along with the "MAIN" IP multicast for the long tail TV channel. In embodiments, the QAS only flows until the MABR gateway receives all required 3-4 fragments, at which point the MABR issues an explicit leave to the QAS IP multicast.

It is noted that the disclosed QAS techniques may be combined with a GOP reduction. For example, a reduction of GOP from 2 seconds to a lower duration may be a useful combination. However, some applications benefit from having longer GOP durations. In the case of using a shorter GOP duration with the disclosed techniques, is to cause a reduction in segment duration that the QAS is cycled through. For example, examples described herein present a two second segment duration in the various diagrams. Shifting to a 1 second GOP duration may result in the same cycling of fragments, however they would just be over 1 second. When a client decides to tune to a channel, and must request multiple (3-4) fragments before decoding multimedia, then if the fragments are being delivered consecutively (as in the general multicast case (FIG. 5 503$x$)) then the clients must still wait for 3x/4x fragment duration. With the disclosed QAS options, the client can potentially receive all 3-4 fragments within just 1 fragment duration. Thus, reducing the GOP/fragment duration significantly will result in bandwidth tradeoffs. The discrete segments may be delivered using common Internet protocols, namely HTTP over TCP/IP, a robust and reliable transfer protocol in which clients request content segments and web servers respond accordingly. Thus, within an embodiment of an adaptive bit rate system, knowledge of all content segments delivered and to whom they are delivered can be provided for use in network-based viewership monitoring.

Figure 9:
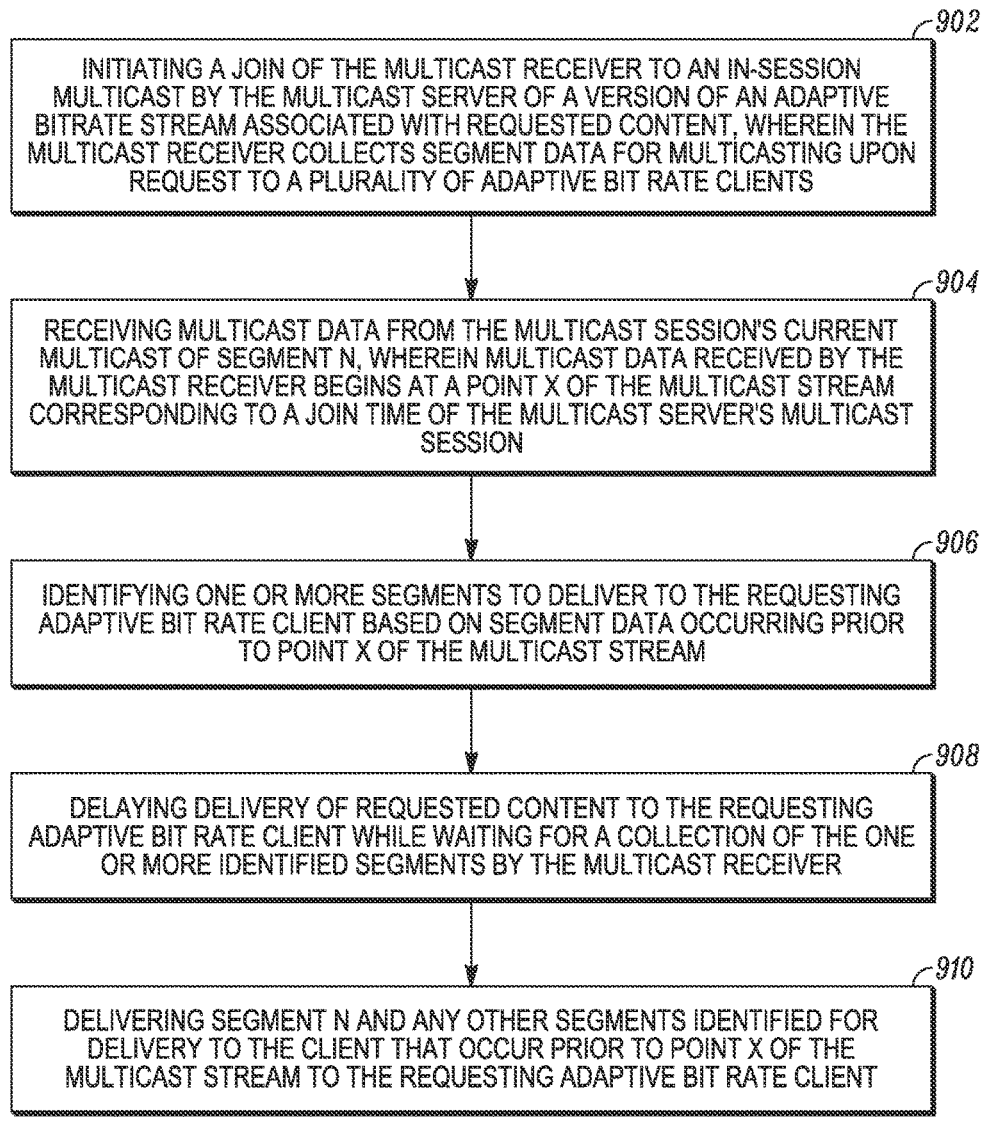
FIG. 9 depicts a flow diagram for the disclosed techniques of a multicasting adaptive bit rate receiver.

FIG. 9 depicts a flow diagram for the disclosed techniques of a multicasting adaptive bit rate receiver. The flow diagram represents processing that may be performed by a system or device to minimize initial startup unicast bandwidth of an ABR client joining a multicast of a bitrate version of an ABR stream, as well as a manner for transitioning between retrieval of segment data from a first server and a second server in an adaptive bit rate system.

At 902, a join of a first server to an in-session multicast by a second server may be initiated. The first server may be an adaptive bit rate server capable of multicasting segments of adaptive bit rate content. The second server may be a multicast receiver capable of adaptive bit rate processing, also referred herein as a multicast adaptive bit rate receiver. The second server may intercept transmissions between the first server and the adaptive bit rate client.

A content delivery network may include an encoder and packager for encoding and segmenting a bit stream into a plurality of segmented bit rate versions of the stream. For example, the adaptive bit rate server in a content delivery network may include one or more encoders and one or more packagers, as described in FIG. 1A. Encoders encode multiple bitrates for the same multimedia content and the content is split into small media segments, wherein each media segment relates to a duration of content and is encoded into multiple different bitrates. The segments may then pass through a packager that prepares media manifest metadata associated with content. The media segments may be encrypted. As disclosed herein, the adaptive bitrate server may generate a master manifest file that identifies available adaptive bitrate versions of content.

The multicasting adaptive bit rate receiver may receive the master manifest file also delivered to the adaptive bit rate client from the adaptive bit rate server. The master manifest file may be continuously updated as media segments become available for live adaptive bitrate streaming in an adaptive bit rate server's multicast session. For example, for live adaptive bitrate streaming, the adaptive bit rate server may continuously receive updated manifest file identifying a plurality of segments for live adaptive bitrate streaming from a content delivery network. Thus, the manifest file may be continuously updated with media segments as they become available. Likewise, the adaptive bit rate receiver can multicasts the most recent media segment once available in the media manifest files. The receiver may receive an adaptive bitrate request for content initiated from the adaptive bit rate client, wherein the requested content is associated with a version of an adaptive bit rate stream identified in the master manifest file. If fragment N is the most recently available fragment in the master manifest file for the requested content, the ABR client may require an even earlier fragment N-x to initiate playback. For example, when using Apple HLS, the ABR client is required to play the $4^{th}$ most recent fragment available within the variant manifest file for the ABR stream (e.g., fragment N-4). The manifest file is updated on every new fragment; thus, the $4^{th}$ most recent fragment in Manifest File #n, becomes the $5^{th}$ most recent fragment in Manifest File #n+1 . . . . In example implementations, the manifest will include the most recent fragment and a plurality of previous fragments, e.g., 20-30 previous fragments. When the Manifest File shows that segment H is the most recent fragment, then the MABR server will be multicasting Segment H. The ABR client will actually start requesting E, then F, then G, then H.

The join of the adaptive bit rate server's multicast session by the multicast receiver may be initiated in response to at least one adaptive bit rate client's adaptive bitrate request. The multicast receiver may join the multicast session during an in-session multicast, i.e., mid-stream. The in-session multicast may be a multicast of a version of an adaptive bitrate stream associated with requested content, wherein the multicast receiver collects segment data for multicasting upon request to a plurality of adaptive bit rate clients. It is noted that the multicasting adaptive bit rate receiver may be configured to multicast to a plurality of adaptive bitrate clients requesting content from the manifest file.

The disclosed QAS system enables a limited number of specific previous low-bitrate fragments (in this case E/F/G/H) to be stripped out of the manifest file when a high-bitrate segment H is multicast out. If the multicast receiver joins a multicast session midstream, the multicast receiver may be joining in the midst of the multicast of a segment N. Thus, the multicast receiver joins may join the multicast at point X of a segment N, wherein X represents an interim point in the multicast data represented by the manifest. In this example, the data prior to the interim point X may have already transmitted via multicast from the adaptive bit rate server. Thus, the multicast receiver has missed receipt of a portion of the stream for the requested content. In embodiments, the MABR Server is the only entity in the system that multicasts content, such that Each MABR receiver issues multicast JOINS to be able to receive this data, and ABR clients never use multicast, they only use unicast HTTP GET requests. The HTTP GET requests can be trapped by the HTTP PROXY in the MABR Receiver entity.

As described herein, such as in FIG. 7, joining a multicast session may trigger DOCSIS Processing in a DOCSIS gateway and trigger the CMTS to issue multicast joins for MABR multicasts. The CMTS may react to a multicast join resulting by updated an MCP list of available IP multicasts to be delivered back to the DOCSIS gateway. The multicast stream may be multicast through the content delivery network to the CMTS and local HTTP gateway. The DOCSIS gateway may process the MCP and collect MABR multicast data. Buffers may be employed to receive MABR multicast data. The MABR RECEIVER entity generally only JOINs multicast traffic as a result of the HTTP Transparent Proxy "trapping" the HTTP GET requests issued by active ABR clients.

In implementations, content may be pre-cached such that fragments are available in the cache ahead of time, prior to an ABR client request. Such pre-emptive caching may be driven using a configuration on the MABR server and/or the MABR receiver. Note that pre-caching can be as a result of a popularity check across all actively viewed video sessions that can lead to a temporal based pre-caching. For example, at 5.59:30 sec every day, the main news channel may be queued up in every GW cache. Alternatively, this can be done in relation to PVR recordings where it is known ahead of time that a PVR may require to record a specific show.

The join of a multicast may be in response to an HTTP request from an ABR client for streaming a particular content. The multicast receiver begins receiving multicast data, wherein a portion of a currently multicast media segment for the particular content may be missed if the multicast of the stream is already in session. In examples, the data missed by the MABR entity can be identified as data prior to the point in time when the receiver began listening for the multicast data from the adaptive bitrate server.

The MABR receiver, using knowledge of a master manifest file, which may be retrieved from the adaptive bit rate server or a local ABR client, and media manifest requests from the local ABR client, may trigger an MABR membership request for a Quick Acquisition Stream for the requested ABR stream. Thus, the multicast receiver may receive the manifest file and join a multicast session mid-stream.

At 904, the multicast receiver receives multicast data from the multicast session's current multicast, e.g., currently multicasting segment N. Media segment N is the media segment currently multicast at the time of the join by the MABR receiver. The multicast data received by the multicast receiver begins at a point X of the multicast stream corresponding to a join time of the multicast server's multicast session. Thus, in response to an ABR client request for program X that is currently multicasting from the content delivery network, the multicast receiver may receive a partial media segment at N. However, the ABR client often requires or desires one or more prior segments of the multicast stream that occurred prior to point X. For example, the ABR client may desire at least as many prior segments to sufficiently playout segments at the ABR client with buffering options and to enable a more seamless playout. Thus, the ABR client may identify that 3-4 segments prior to segment N as well as a complete segment N are needed by the ABR client. As disclosed herein, instead of requiring the ABR client to issue individual unicast requests for the desired media segments, the multicast receiver enables a multicast stream associated with the manifest file, as received and updated, streamed by the multicast server for reducing unicast bandwidth used by ABR client devices.

At 906, the multicast receiver identifies one or more segments to deliver to the requesting adaptive bit rate client. The segments are identified based on segment data that has occurred (e.g., has already been transmitted by the adaptive bitrate receiver's multicasting) prior to point X of the multicast stream. The prior segments identified for delivery to the adaptive bit rate client may be identified from requests for the specific prior segments from the adaptive bit rate client. In an example implementation, the multicast receiver identifies the desired one or more prior segments to deliver to the ABR client based on explicit requests for such content, issued by the ABR client. For example, an ABR client may issue unicast HTTP requests for the one or more prior segments. The ABR client follows the ABR protocol it uses, and issues unicast requests for all required ABR segments (including the earlier segments listed in the manifest file). In implementations, the MABR receiver, ABR client, and/or MABR server may be configured to identify how many prior segments should be made available based on an ABR client's request for content and/or based on the current fragment streamed from the MABR server.

The ABR client may issue HTTP requests for content. The multicast receiver may include an HTTP proxy for receiving the HTTP requests intended for the adaptive bit rate server, and queue responses to the HTTP requests pending receipt of the media segments at the multicast receiver.

The multicast receiver may intercept the requests for content sent from the adaptive bit rate client to the first server to identify the requested content and to identify the prior segments to be delivered to the requesting adaptive bit rate client. For example, when an ABR client requests media content, and determines the content prior to the start point of the multicast join point is desired, the ABR may issue requests for the corresponding segments.

The one or more identified segments may include a complete segment N when point X occurs after the starting point of segment N. In embodiments, the 3 or 4 segments prior to point X of the current multicast stream are identified for delivery to the requesting adaptive bit rate client.

At 908, the multicast receiver may delay delivery of requested content to the requesting adaptive bit rate client while waiting for a collection of the one or more prior segments identified by the multicast receiver for delivery to the adaptive bit rate client to delay a playout by the ABR client of the segment currently multicast by the adaptive bit rate server. Delaying delivery of requested content to the requesting adaptive bit rate client while waiting for a collection of the identified segments by the multicasting adaptive bit rate receiver may include delaying delivery of the requested content until receipt from the adaptive bit rate server of the identified segments unavailable in a local cache.

For example, the multicast receiver may intercept the requests from the ABR client and hold the ABR client's unicast requests. As the prior segments requested via unicast are instead received at the multicast receiver, segments associated with the queued requests from the adaptive bit rate client may be delivered from the multicast receiver to the requesting adaptive bit rate client. Thus, the requests for the prior segments queued in the multicast receiver may delay issuance of the requested content to the adaptive bit rate client.

The one or more identified segments may be collected by the multicast receiver. The multicast receiver may determine first whether the segment data identified for delivery to the requesting adaptive bit rate client is available in a local cache. This may occur, for example, where another adaptive bit rate client served by the same multicast receiver has already similar content and therefore segments for delivering to the currently requesting adaptive bit rate client are already collected in a local cache at the multicast receiver. For segments identified for delivery to the requesting adaptive bit rate client that are unavailable at the multicast receiver, the multicast receiver may join a quick stream multicast session prepared and multicast by the MABR server.

The MABR server's quick acquisition stream (QAS) technique allows multiple stripped fragments to be multicasted in a just-in time-mode so that the MABR receiver can collect the stripped fragments for playout to the ABR clients. As described above, if the QAS streams are being broadcast, the MABR Receiver/HTTP proxy HOLD OFF replying to the ABR client HTTP requests UNTIL the MABR QAS multicast fragments are received. The receiver, using knowledge of a master manifest file received from the adaptive bit rate server and media manifest requests from the requesting adaptive bit rate client, a membership request to join a quick acquisition stream for the requested ABR stream for receiving segments multicast from the adaptive bit rate server.

In embodiments, the multicast receiver issues one or more unicast requests to the adaptive bit rate server for the segment data identified for delivery to the requesting adaptive bit rate client. The standard handling of a unicast ABR requests is to pass through the CMTS like all other data traffic (ie transparently).

The multicast adaptive bit rate receiver may issue a request to the adaptive bit rate server for segment data associated with the identified segments, including a request for a complete segment N when point X occurs after the starting point of segment N. The multicasting adaptive bit rate receiver may issue to the adaptive bit rate server a partial unicast request identifying a specific bitrate covering missing bytes of media segment N due to the join of the in-session multicast at point X. For example, the multicast receiver may perform a partial unicast HTTP request with a specific byte range covering missing bytes of current media segment (i.e., instead of requesting the entire media segment), and then decide based on the % of already received multicast media segments which additional prior segments to request. Prior to delivery to the ABR client, the multicast receiver may reconstitute a segment N by combining received segment N multicast data with received segment N unicast data. The prior segments received from the adaptive bit rate server may be at a lower bit rate than the bitrate identified by the ABR client in the request for content.

In response to the multicast receiver's request, the multicast receiver receives the identified segment data that occurs prior to point X of the multicast stream. In embodiments, the one or more identified segments are received by the receiver within a single segment time period while segment N+1 is multicast by the adaptive bit rate server. The multicast receiver may receive the prior complete segments and/or partial multicast data during a single segment time period. As described below, the requested media segments can be provided to the ABR client in a time less than a segment duration as available by the origin server. Referring back to the example depicted in FIG. 6, the multicast receiver joins while current segment C is being multicast from the adaptive bit rate server. The ABR client determines that segments A, B, and a complete segment C are needed to join multicast because the start of C was missed, join quick stream to, start receiving segment D at MABR receiver and at the same time receive quick streams QB, QA, and QC, deliver QA, Qb, and Qc to client in response to HTTP requests for A, B, C.

The multicast receiver may be responsible for any retransmissions that may occur during the receipt of the QAS stream. The multicast receiver may also be configured to deliver segments in accordance with a desired segment pattern and number of segments to repeat per segment duration. The multicast receiver may discard segments already received and stored. The multicast receiver may discard segments received from the first server via unicast or multicast after a duration of time.

AT 910, the multicast receiver delivers segment N and any other segments identified for delivery to the client that occurred prior to point X of the multicast stream to the requesting adaptive bit rate client.

As described above, the multicast receiver may collect multicast media segments and prepare them in local HTTP cache by operating a local HTTP proxy. If the requested media segments are available in local HTTP proxy, local ABR clients receive the segments from the local HTTP cache; if cache does not have any matching media segments, HTTP media segment request may be propagated to a remote ABR origin server. In response to request for a segment, one or more prior segments for the corresponding stream are delivered to a gateway cache that is local to the ABR client. The media segments received via unicast at the local proxy may be delivered and served to any other local ABR clients that request the same media segment.

The multicasting adaptive bit rate receiver may identify a segment pattern in mapping information that associates ABR streams to a specific multicast group. The segments received from the adaptive bit rate server may be delivered by the multicast receiver to the adaptive bit rate client in accordance with a segment pattern and a number of segments designated for repeat delivery per segment duration. The segments associated with the queued requests from the adaptive bit rate client may be delivered to the requesting adaptive bit rate client in an order corresponding to the order of the requests sent by the adaptive bit rate client.

In embodiments, the multicast receiver's HTTP proxy responds to ABR client requests for segment with the combined unicast/multicast media segment. The HTTP proxy then may deliver the collected quick stream media segments to ABR client. Other than the unicast HTTP requests for master and media manifests, all media segments are delivered using MABR. Thus, in embodiments, the ABR client never deals with multicast. Without the disclosed MABR receiver and/or server, the ABR client unicast requests are sent to the ABR origin server. When MABR is used without the disclosed QAS techniques, all ABR client unicast requests are trapped by the HTTP Transparent Proxy; anything not in the cache (i.e., at the START of a new request for a program) will be passed to the ABR ORIGIN SERVER, anything that is in the cache may be served from the cache to the requesting ABR client.

If QAS MABR is used, then the HTTP proxy may intervene to delay responding to the unicast ABR requests from the ABR client until the multicast stripped fragments are received; the HTTP Proxy then responds with UNICAST responses for each outstanding HTTP GET request to the ABR client.

The multicast receiver may transition the response to ABR client request to the adaptive bit rater server's multicast once the ABR client's buffer has caught up to the currently multicasted segment. For example, the multicast receiver may exit a QAS multicast once the multicast receiver has managed to transition to receiving the highest encoded bitrate media segments and no longer needs the QAS stream. Thus, the QAS stream may only flow to the adaptive bit rate client until the multicast receiver receives all required prior segments for deliver to the ABR client. The multicast receiver may at this issue an explicit leave to the QAS IP multicast to which it may be joined.

The stripped multicast media segments may be delivered to ABR client during a current media segment playout duration (i.e., delivered during the same segment duration as the current media segment is multicasting to the MABR, as opposed to normally the MABR delivering the current media segment during the segment duration; thus instead the prior media segments may be received in the same time frame). As described above, the HTTP requests queued in proxy may be delivered to local ABR client as the stripped multicast media segments are received, eliminating any need for unicast media segment retrieval related to the current media segment.

The multicast receiver may continue to receive subsequent media segments from the adaptive bit rate server for delivery to other connected ABR clients. Thus, the multicast receiver can make all received segments available to other local ABR clients to minimize unicast requests by the plurality of ABR clients. The result may be to minimize unicast requests/bandwidth, which occur more heavily during channel changes or during initial startup, thereby reserving the unicast bandwidth of an ABR client. The initial start-up BW requirements may exist every time an ABR client decides to switch from one ABR linear stream to another. Instead of every ABR streaming session consuming single-use BW per ABR client, the techniques of the multicast receiver may transparently reducing the BW demands of multiple unicast ABR clients watching the same linear/live content down to a single ABR BW demand per broadcast/multicast domain The multicast receiver may make segments received at the multicasting adaptive bit rate receiver available to other ABR clients in a multicast group, minimizing unicast requests to the first server by the ABR clients in the multicast group for the available media segments. For example, a second ABR client is proxied on the response to its HTTP request for the ABR manifest file; second ABR client issues HTTP request for manifest file; HTTP client intercepts HTTP request and gets MABR entity running with specific ABR stream and HTTP request, but checks local cache for any previously received quick stream segments. If the second adaptive bit rate client requests content requested by the first adaptive bit rate client; the second server delivering segment data available from a cache local to the second server to the second adaptive bit rate client.

As described herein, the types of content that the packager may package includes Live Linear, VOD, StartOver, and nDVR. VOD content and nDVR content were described above. Live content are television programs that are watched in real time. This means that packaging must be an ongoing process that occurs simultaneously with playback. StartOver contents are live content whose viewing can be started after the content start time. You can for example at 1:15 PM start watching a 1:00 PM live program.

The components between the content source delivering streams 102 or 104 and the IP content delivery network used by the adaptive bit rate system 100 to deliver fragments to the client device 134 may be located in a headend or other suitable location within a content provider network. A cable television headend is a master facility for receiving television signals for processing and distributing content over a cable television system. The headend typically is a regional or local hub that is part of a larger service provider distribution system, such as a cable television distribution system. An example is a cable provider that distributes television programs to subscribers, often through a network of headends or nodes, via radio frequency (RF) signals transmitted through coaxial cables or light pulses through fiber-optic cables. In embodiments, content is received at the headend from a content source (such as a content server of a program provider).

Adaptive bit rate techniques enable the content delivery system to detect a user's bandwidth and optionally other capabilities, such as CPU capacity, in real time and adjust the quality of a video stream accordingly. Since adaptive bit rate fragments are available on the server in one of several bit rates, the client may switch bit rates at the fragment boundaries. Thus, the client can adjust its request for the next fragment. It uses an encoder which can encode a single source video at multiple bit rates. The client switches between streaming the different encodings depending on available resources. The result: very little buffering, fast start time and a good experience for both high-end and low-end connections. The result is a system that can dynamically adjust to varying network congestion levels. Often, the quality of the video stream streamed to a client device is adjusted in real time based on the bandwidth and CPU of the client device. For example, the client may measure the available bandwidth and request a fragment that best matches a measured available bit rate.

HTTP is a manner for retrieving files from the Internet and the technology is built into web browsers. HTTP has more recently become a preferred method to deliver video. It can be used to deliver video in an adaptive streaming manner in which the video is encoded into various bit rates and fragmented for delivery. Business rules, such as network congestion or processor utilization, are used to determine which bit rate is delivered at what time.

The disclosed packager supports adaptive bit rate streaming in any container formats. Examples of these adaptive bit rate video container formats include HTTP Live Streaming (Apple—HLS), Internet Information Services—Smooth Streaming (Microsoft—HSS), and HTTP Dynamic Streaming (Adobe—HDS). The container formats have become de-facto industry standards due to their widespread use. The disclosed packager also supports profiles from the MPEG-DASH (Dynamic Adaptive Streaming over HTTP) format, which is a standardized adaptive streaming specification that has been developed as an industry standard by MPEG. This system could be implemented in MPEG DASH without any special logic in the client and most likely in existing proprietary adaptive bit rate schemes.

An illustrative adaptive streaming system 100 may implement, for example, one or more open or proprietary protocols for adaptive bit rate streaming such as HTTP Live Streaming (HLS), SecureMedia's Encryptonite One HLS+ solution, Microsoft Smooth Streaming, HTTP Dynamic Streaming, Dynamic Adaptive Streaming over HTTP (DASH), HTTP Smooth Streaming (HSS), and the like. The packager converts one or more multi-bit rate streams of an input stream group into logical files formatted for a particular output streaming format such as HLS, HDS, HSS or DASH. In HSS, HDS and DASH all of the chunks associated with a given format and bit rate are stored within the same file. In HLS however, each chunk is stored in its own file. So assuming two second chunks, three bitrates and 30 minute program the packager will create three HSS files but 2700 HLS files. The packager can create multiple formats simultaneously. Each format to be generated is specified by a profile.

Apple HLS breaks the whole content stream in to a sequence of small HTTP based file downloads. As the stream is played, the client selects from a number of different bit rate streams based on the client CPU and bandwidth.

Microsoft HSS is a media services extension to enable adaptive streaming of media to clients over HTTP, using a concept of delivering small content fragments (e.g., 2 seconds video) and verifying that each has arrived within appropriate time and playback at the expected quality level.

Overall quality with adaptive bit rate may be the best possible for a given user's network connection, thereby maximizing the quality of experience.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

I claim:

1. A multicast receiver in an adaptive bit rate system, the adaptive bit rate system having a multicast server for generating a manifest file identifying available content and for multicasting segments of an adaptive bitrate stream to a plurality of adaptive bit rate clients in a multicast group and to the multicast receiver, the multicast receiver for reducing an initial startup unicast bandwidth for at least one adaptive bit rate client requesting to join the multicast group, the multicast receiver comprising:
one or more processors; and
a memory communicatively coupled to at least one of the one or more processors, the one or more processors configured for:
in response to at least one adaptive bit rate client's adaptive bitrate request, initiating a join of the multicast receiver to an in-session multicast stream by the multicast server having a version of the adaptive bitrate stream associated with requested content, wherein the multicast receiver collects segment data for transmitting upon request to the plurality of adaptive bit rate clients;
receiving multicast data from a multicast session's current multicast of segment N, wherein multicast data received by the multicast receiver begins at a point X of the in-session multicast stream corresponding to a join time of the multicast receiver to the multicast server's multicast session;
identifying one or more segments to deliver to the requesting adaptive bit rate client based on segment data occurring prior to point X of the multicast stream, the identified one or more segments including at least one of a segment prior to segment N in the multicast stream or segment N;
delaying delivery of requested content to the requesting adaptive bit rate client while waiting for a collection of the one or more identified segments by the multicast receiver; and
delivering the one or more segments identified for delivery to the at least one adaptive bit rate client that occur prior to point X of the multicast stream to the requesting adaptive bit rate client.

2. The multicast receiver of claim 1, wherein delaying delivery of requested content to the requesting adaptive bit rate client while waiting for the collection of the identified one or more segments by the multicast receiver comprises delaying delivery of the requested content until receipt from the multicast server of the identified segments is available in a local cache.

3. The multicast receiver of claim 1, wherein the one or more identified segments includes a complete segment N when point X occurs after a starting point of segment N but before the starting point of segment N+1.

4. The multicast receiver of claim 3, wherein the multicast receiver issues to the multicast server a partial unicast request identifying a specific bitrate covering missing bytes of media segment N due to the join of the in-session multicast stream at point X.

5. The multicast receiver of claim 4, further comprising reconstituting segment N by combining received segment N multicast data with received segment N unicast data.

6. The multicast receiver of claim 1, wherein the multicast receiver issues a request to the multicast server for segment data associated with the identified one or more segments.

7. The multicast receiver of claim 1, wherein the one or more identified segments are received by the receiver within a single segment time period while segment N+1 is multicast by the multicast server.

8. The multicast receiver of claim 1, further comprising transitioning the response to the requesting adaptive bit rate client from an output of the multicast receiver to the multicast stream multicasting from the multicast server.

9. The multicast receiver of claim 1, wherein the one or more identified segments are collected by:
determining whether the segment data identified for delivery to the requesting adaptive bit rate client is available in a local cache;
for unavailable segment data identified for delivery to the requesting adaptive bit rate client, joining a quick stream multicast session from the multicast server for identified segment data and receiving the identified segment data that occurs prior to point X of the multicast stream; and
delivering the identified segment data that occurs prior to point X of the multicast stream to the requesting adaptive bit rate client.

10. The multicast receiver of claim 1, further comprising receiving a master manifest file delivered to the at least one adaptive bit rate client from the multicast server, the master manifest file continuously updated as media segments become available for live adaptive bitrate streaming in the multicast server's multicast session.

11. The multicast receiver of claim 10, further comprising receiving an adaptive bitrate request for content initiated from the at least one adaptive bit rate client, wherein the requested content is associated with a version of an adaptive bit rate stream identified in the master manifest file.

12. The multicast receiver of claim 1, further comprising intercepting the request for content sent from the at least one adaptive bit rate client to the multicast server to identify the requested content and to identify the segments prior to point X to be delivered to the requesting adaptive bit rate client.

13. The multicast receiver of claim 1, wherein the segments prior to point X for delivery to the at least one adaptive bit rate client are identified from requests for specific prior segments from the at least one adaptive bit rate client, the requests for the prior segments queued in the multicast receiver thereby delaying issuance of the requested content to the at least one adaptive bit rate client.

14. The multicast receiver of claim 13, wherein as the segments prior to point X requested via unicast are received at the multicast receiver, segments associated with the queued requests from the at least one adaptive bit rate client are delivered from multicasting adaptive bit rate receiver to the requesting adaptive bit rate client.

15. The multicast receiver of claim 14, wherein the segments associated with the queued requests from the at least one adaptive bit rate client are delivered to the requesting adaptive bit rate client in an order corresponding to the order of the requests sent by the at least one adaptive bit rate client.

16. The multicast receiver of claim 1, wherein a bitrate of the identified segments prior to point X may be a different bitrate available in a manifest file than a bitrate of multicasted segment N.

17. The multicast receiver of claim 1, wherein segments received at the multicast receiver are available to other adaptive bit rate (ABR) clients, minimizing unicast requests to the multicast server by the ABR clients in the multicast group.

18. The multicast receiver of claim 1, the multicast receiver discarding segments received from the multicast server after a duration of time.

19. The multicast receiver of claim 1, wherein a multicast session to which the at least one adaptive bit rate client is transitioned to is at a higher encoded bit rate than a bitrate of the segments received from the multicast receiver.

20. A method for transitioning between retrieval of segment data from a first server and a second server in an adaptive bit rate system, the method comprising:
  in response to a client's adaptive bitrate request, the second server joining a multicast session transmitting a stream of a version of an adaptive bit rate stream associated with a requested content, wherein the second server collects segment data for transmitting to a plurality of adaptive bit rate clients;
  receiving currently multicast media segment N of the multicast session, wherein multicast data is received by the second server beginning at a point X of the multicast stream corresponding to a join time of the multicast session by the second server;
  identifying whether to deliver any segment data prior to point X of the multicast stream to the requesting adaptive bit rate client;
  during a segment interval in which segment N is delivered to the second server, the second server:
    determining whether the segment data identified for delivery to the requesting adaptive bit rate client is available in a cache local to the second server;
    for unavailable segment data identified for delivery to the requesting adaptive bit rate client, joining a quick stream multicast session or issuing one or more unicast requests to the first server for segment data identified for delivery to the requesting adaptive bit rate client;
    delaying delivery of the requested content to the requesting adaptive bit rate client while waiting for receipt of the identified segment data at the second server;
    receiving the identified segment data that occurs prior to point X of the multicast stream;
    reconstituting segment N by combining segment N multicast data with unicast data when point X occurs in an interim of segment N;
    delivering segment N and the identified segment data that occurs prior to point X of the multicast stream to the requesting adaptive bit rate client; and
  transitioning the response to the requesting adaptive bit rate client to the multicast stream multicasting from the first server.

* * * * *